United States Patent
Frost

(10) Patent No.: US 7,818,349 B2
(45) Date of Patent: Oct. 19, 2010

(54) ULTRA-SHARED-NOTHING PARALLEL DATABASE

(75) Inventor: Stuart Frost, Laguna Niguel, CA (US)

(73) Assignee: DATAllegro, Inc., Aliso Viejo, CA (US)

( * ) Notice: Subject to any disclaimer, the term of this patent is extended or adjusted under 35 U.S.C. 154(b) by 275 days.

(21) Appl. No.: 11/059,510

(22) Filed: Feb. 17, 2005

(65) Prior Publication Data

US 2005/0187977 A1 Aug. 25, 2005

Related U.S. Application Data

(60) Provisional application No. 60/546,428, filed on Feb. 21, 2004.

(51) Int. Cl.
G06F 7/00 (2006.01)
G06F 17/30 (2006.01)
(52) U.S. Cl. .................. 707/802; 707/808; 711/172
(58) Field of Classification Search ............. 707/1–10, 707/100–104.1, 200–206, 208–211, 600–831; 709/208–211; 711/205–208, 221, 153, 171–173
See application file for complete search history.

(56) References Cited

U.S. PATENT DOCUMENTS

| | | | |
|---|---|---|---|
| 5,590,284 A | 12/1996 | Crosetto | |
| 5,737,549 A * | 4/1998 | Hersch et al. | 709/203 |
| 5,848,408 A * | 12/1998 | Jakobsson et al. | 707/3 |
| 5,864,857 A | 1/1999 | Ohata et al. | |
| 5,909,681 A * | 6/1999 | Passera et al. | 707/8 |
| 6,092,062 A | 7/2000 | Lohman et al. | |
| 6,968,335 B2 * | 11/2005 | Bayliss et al. | 707/10 |
| 7,085,769 B1 | 8/2006 | Luo et al. | |

FOREIGN PATENT DOCUMENTS

| WO | WO 02/25481 A2 | 3/2002 |
|---|---|---|
| WO | WO 02/25557 A2 | 3/2002 |

OTHER PUBLICATIONS

Jin-Ho Kim et al., An efficient processing of queries with joins and aggregate functions in data warehousing environment, Dec. 10, 2002, IEEE, 785-791.*
Bellatreche et al., What can partitioning do for your data warehouses and data marts?, Aug. 6, 2002, IEEE, 437-445.*

(Continued)

*Primary Examiner*—Jean B Fleurantin
(74) *Attorney, Agent, or Firm*—Wolf, Greenfield & Sacks, P.C.

(57) ABSTRACT

An ultra-shared-nothing parallel database system includes at least one master node and multiple slave nodes. A database consisting of at least one fact table and multiple dimension tables is partitioned and distributed across the slave nodes of the database system so that queries are processed in parallel without requiring the transfer of data between the slave nodes. The fact table and a first dimension table of the database are partitioned across the slave nodes. The other dimension tables of the database are duplicated on each of the slave nodes and at least one of these other dimension tables is partitioned across the slave nodes.

29 Claims, 19 Drawing Sheets

OTHER PUBLICATIONS

Baru et al., "DB2 Parallel Edition," *IBM Systems Journal*, 34(2):292-322 (1995).

Dewitt et al., "The Gamma Database Machine Project," Computer Sciences Technical Report 921, University of Wisconsin-Madison, Mar. 1990, pp. 1-39.

Dewitt et al., "Multiprocessor Hash-Based Join Algorithms," *Proceedings of 11th Int'l Conf. on Very Large Data Bases*, Stockholm, Sweden, vol. 11, pp. 151-164 (1985).

Dewitt et al., "Parallel Database Systems: The Future of High Performance Database Processing," *Communications of the ACM*, vol. 36(6):1-26 (Jun. 1992).

Epstein, Robert S., "Query Processing Techniques for Distributed, Relational Data Base Systems," *Computer Science: Distributed Database Systems*, No. 13, Harold S. Stone ed.,UMI Research Press, Ann Arbor, Michigan, pp. 1-104, 1982.

Mehta et al., "Data placement in shared-nothing parallel database systems," *The VLDB Journal* pp. 53-72, Feb. 1997, http://delivery.acm.org/10.1145/770000/765547/70060053.pdf?key1=765547&key2=1140469421&coll=GUIDE&dl=GUIDE&CFID=47924469&CFTOKEN=75342509, retrieved Aug. 7, 2009.

Schneider et al., "A Performance Evaluation of Four Parallel Join Algorithms in a Shared-Nothing Multiprocessor Environment," ACM SIGMOD Record, vol. 18(2):110-121 (Jun. 1989).

Sheth et al., "Federated Database Systems for Managing Distributed, Heterogeneous, and Autonomous Databases," ACM Computing Surveys, vol. 22(3):183-236 (Sep. 1990).

Stöhr et al., "Multi-Dimensional Database Allocation for Parallel Data Warehouses," *Proc. 26th Int'l Conference on Very Large Data Bases*, Cairo Egypt 2000, pp. 273-284, http://www.sigmod.org/v1db/conf/2000/P273.pdf, retrieved Aug. 7, 2009.

Stonebraker et al., "Mariposa: A New Architecture for Distributed Data," *Proc. 10th Int'l Conference on Data Engineering*, 1994, pp. 54-65.

Sun et al., "Dynamic maintenance of multidimensional range data partitioning for parallel data processing," *Proc. 1st ACM Int'l. Workshop on Data Warehousing and OLAP*, Washington, D.C., USA, 1998, pp. 72-79, http://doi.acm.org/10.1145/294260.294275, retrieved Aug. 7, 2009.

Supplementary European Search Report for European Patent Application No. EP 05 71 3785 dated Sep. 23, 2009.

Tamer Özsu et al., "Principles of Distributed Database Systems," 2nd ed., Chapter 13, pp. 430-432 and 436-441, 1999.

Taniar et al., "*Aggregate-Join* Query Processing in Parallel Database Systems," *Proc. 4th Int'l Conference on High-Performance Computing in the Asia-Pacific Region*, vol. 2, pp. 824-829 (2000).

Wolf et al., "Comparative Performance of Parallel Join Algorithms," *Proc. 1st Int'l Conference on Parallel and Distributed Information Systems*, Dec. 4-6, 1991, Miami Beach, Florida, pp. 78-88.

Yu et al., "Distributed Query Processing," *Computing Surveys*, vol. 16(4):399-433 (Dec. 1984).

* cited by examiner

ULTRA-SHARED-NOTHING PARALLEL DATABASE

This application claims the benefit of U.S. Provisional Application No. 60/546,428, filed Feb. 21, 2004, which is hereby incorporated by reference.

FIELD OF THE INVENTION

The present invention concerns parallel database systems and in particular concerns a shared-nothing parallel database system.

BACKGROUND OF THE INVENTION

Parallel database systems designed using a shared-nothing architecture consist of multiple nodes each having its own processing, memory and disk resources. In these systems, the tables of a database are distributed across the system nodes. Queries against the database are then run in parallel on multiple nodes at the same time. Shared-nothing parallel database systems are intended to provide linear scaling where increasing the number of nodes in the system improves performance and allows larger datasets to be handled. However, conventional designs fail to provide linear scaling due to problems such as query skew.

Query skew occurs when two different queries of a similar level of complexity against the same database take radically different times to execute. In conventional shared-nothing parallel database systems, query skew results from having to transfer large amounts of data between nodes to process certain queries while other queries are processed with little or no data transfer. This transfer of data slows down query processing and creates bottlenecks in conventional systems.

For example, in a conventional system having four nodes, database tables are often equally distributed with a quarter of each table stored on each node. Typical database queries include one or more "joins" which scan database tables searching for matches between a primary key of one table and a foreign key of another table. In order to process a join of two database tables, each node must transfer its portion of one of the database tables to the other nodes. Depending on which database tables are being joined and how many joins are included in a query, this data transfer can require significant time which delays query processing. As datasets become larger and the number of query sessions grows, query skew increasingly reduces system performance. Given the nature of this problem, incorporating additional nodes in these conventional systems does not relieve this bottleneck in query processing.

Accordingly, a need exists for an improved shared-nothing parallel database system which mitigates query skew. Furthermore, the improved system should minimize administrative overhead required to operate the system and should provide secure failover protection.

SUMMARY OF THE INVENTION

The present invention addresses the foregoing deficiencies of conventional shared-nothing database systems by providing an ultra-shared-nothing parallel database system. The ultra-shared-nothing parallel database system of the invention partitions and distributes the tables of a database across multiple slave nodes in a manner that allows database queries to be processed in parallel without requiring as much of the data to be transferred between the nodes as in the prior art. The database is distributed according to a set of rules that relate to the structure of the database schema and the relative size of the tables. By significantly reducing the need to transfer data between nodes, the present invention significantly improves system performance by reducing network traffic and the resultant query skew.

For a given database, the fact table and one of the dimension tables are partitioned on a common key and distributed across multiple slave nodes. Small dimension, tables in the database are duplicated on all of the slave nodes in the system. The remaining dimension tables are both partitioned across the slave nodes and duplicated on all of the slave nodes. This allows the database system to execute the majority of queries without causing significant network traffic either between the slave nodes or between the master node and the slave nodes.

According to one aspect of the invention, a parallel database system is provided that includes a master node and multiple slave nodes. A database, which includes a fact table and multiple dimension tables, is distributed across the slave nodes of the database system. To distribute the tables of the database, the fact table and a first dimension table are partitioned across the slave nodes. The remaining dimension tables are duplicated on each of the slave nodes and, if they have a minimum size, also partitioned across the slave nodes.

Preferably, the fact table and the first dimension table are partitioned on a common key. The remaining dimension tables are optionally partitioned by row or by column across the slave nodes of the system. Queries against the database are translated into at least one sub-query that is executable by the slave nodes of the parallel database system without transferring data between the slave nodes.

According to another aspect of the invention, the parallel database system caches query results produced by the database system. Preferably, the master node includes a query cache for caching query results produced by the master node and the slave nodes each include a query cache for caching sub-query results produced by the respective slave nodes.

According to another aspect of the invention, each of the slave nodes of the database system is assigned one or more failover partners. Each failover partner stores all or part of the dataset of its failover partner in addition to its own tables. In the event of a slave node failure, sub-queries intended for a failed slave node are executed by a failover partner in place of the failed slave node.

The invention summarized above provides an efficient and reliable parallel database system. Query skew is removed from the processing of database queries thereby allowing near linear scaling of the database system. A bi-level query cache reduces the processing of repetitive queries with no intervening changes to the underlying tables of the queries. Finally, the use of failover partners among the slave nodes provides a cost-effective solution for providing continuous operation in the event of node failure.

The foregoing summary of the invention has been provided so that the nature of the invention can be understood quickly. A more detailed and complete understanding of the preferred embodiments of the invention can be obtained by reference to the following detailed description of the invention and the associated drawings.

DETAILED DESCRIPTION OF THE INVENTION

Figure 1:
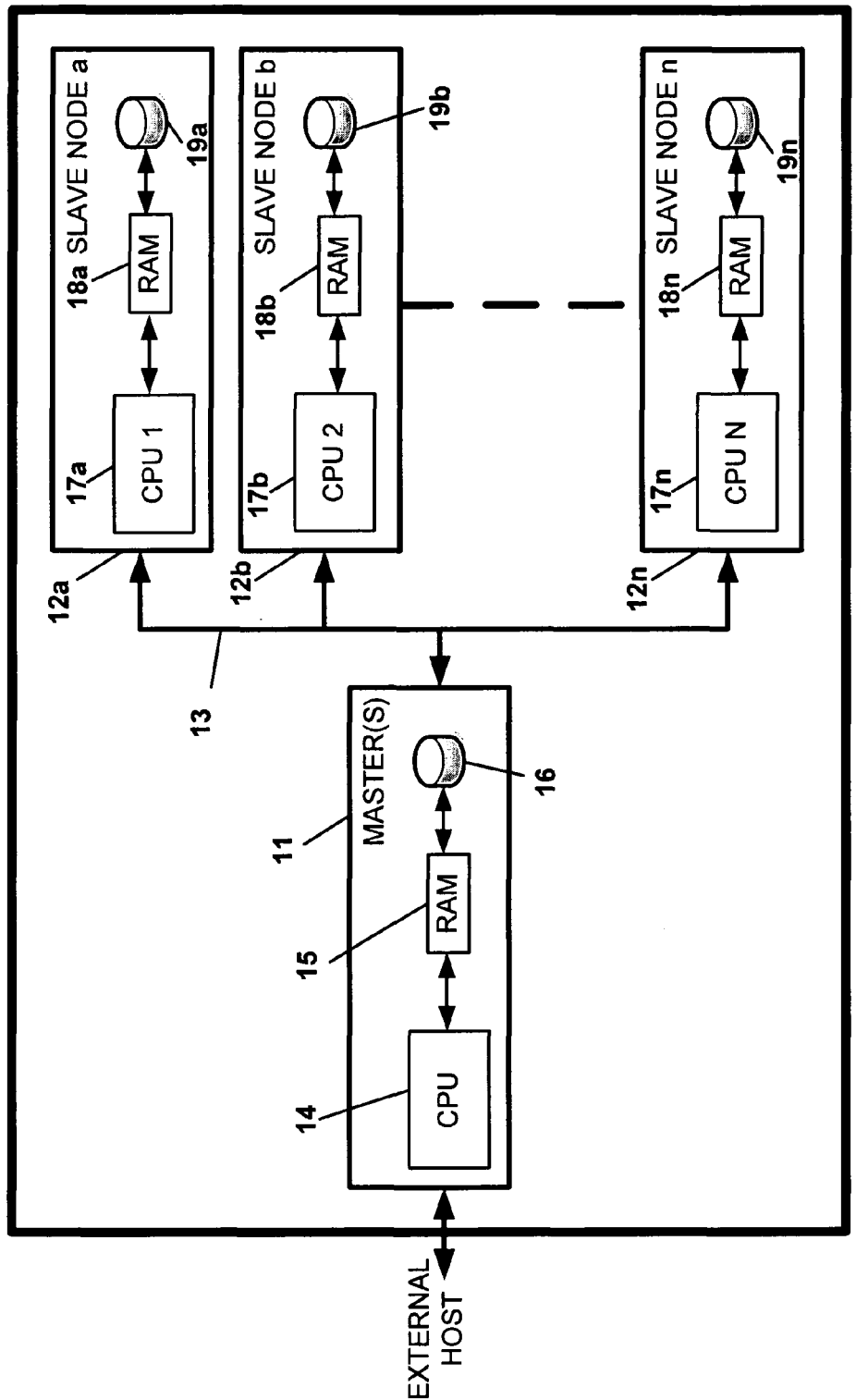
FIG. 1 is a schematic diagram depicting the hardware architecture of a shared-nothing parallel database system.

The present invention is an improved shared-nothing parallel database system referred to as an ultra-shared-nothing parallel database system. The ultra-shared-nothing parallel database system is configured in a manner similar to conventional shared-nothing parallel database systems using at least one master node and multiple slave nodes. FIG. 1 is a schematic diagram depicting the hardware architecture of one embodiment of the ultra-shared-nothing parallel database system.

FIG. 1 depicts the configuration of database system 10, which includes master node 11 and slave nodes 12a to 12n. To simplify the diagram, FIG. 1 includes only one master node 11. However, as described in more detail below, other embodiments of the invention incorporate multiple master nodes 11 into database system 10. Master node 11 and slave nodes 12a to 12n are interconnected via network 13. Preferably, network 13 is a redundant network used to improve the reliability of database system 10. Alternatively, a non-redundant network can be used for non-critical applications. Network 13 is implemented using any of a number of networking technologies and protocols well known to those skilled in the art. Example networks include, but are not limited to, TCP/IP over Ethernet and MPI (Message Passing Interface) over Infiniband.

Each node of database system 10 includes its own processing, memory and disk resources. Specifically, master node 11 includes central processing unit (CPU) 14, random-access memory (RAM) 15 and disk 16. Slave nodes 12a to 12n include CPUs 17a to 17n, RAM 18a to 18n and disks 19a to 19n, respectively. The CPUs execute program instructions of software modules stored on the respective disks. The CPUs use the RAM as workspace to load instruction sequences and to store and manipulate data. While each node is depicted as including a single CPU and a single disk, one skilled in the art will recognize that each node can include multiple CPUs and multiple disks to improve the performance of the system. For example, one implementation of the invention uses nodes having dual processors and arrays of twelve hard disks.

Figure 2:
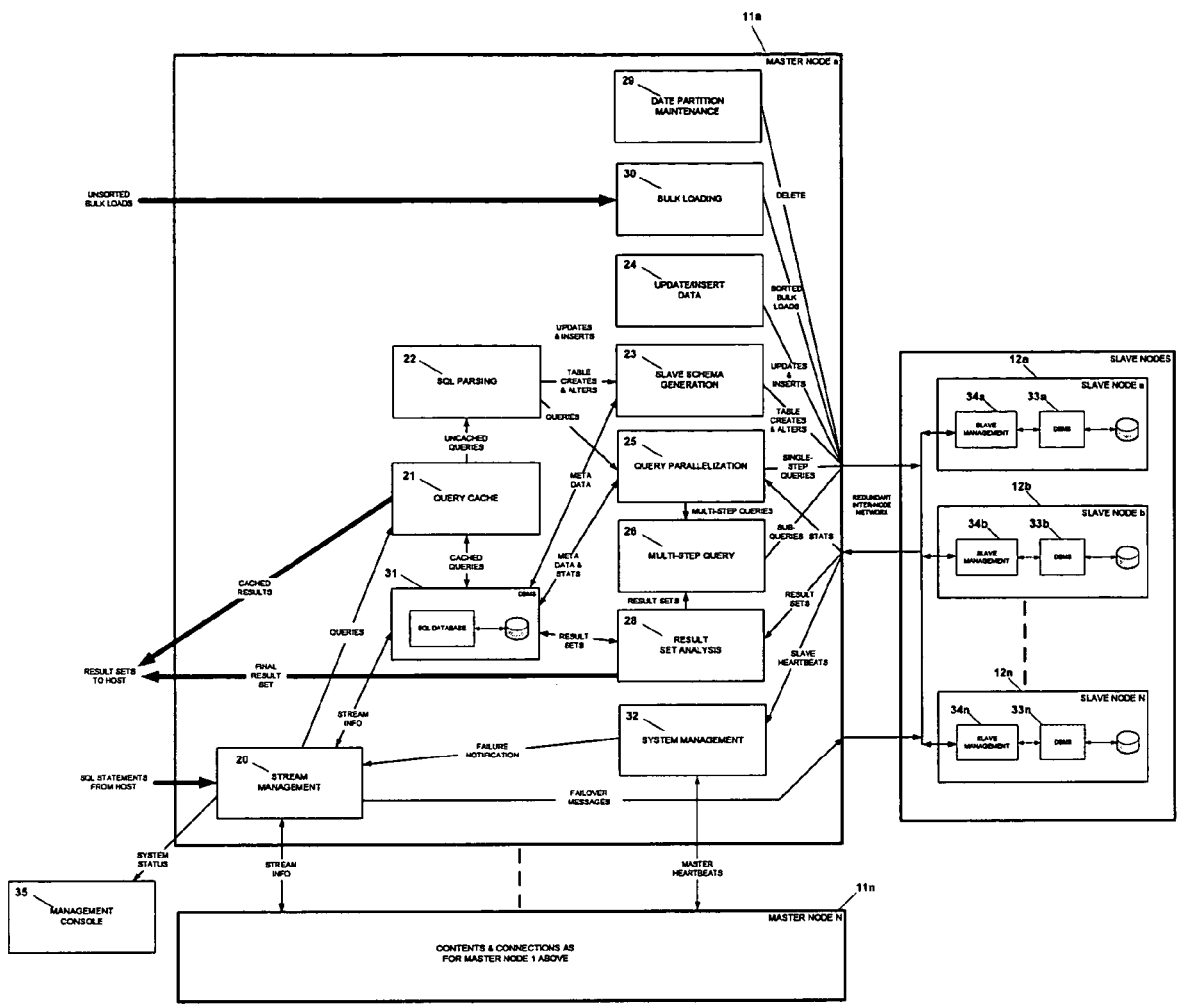
FIG. 2 is a schematic diagram depicting the software architecture of an ultra-shared-nothing parallel database system according to one embodiment of the invention.

In addition to basic software components, such as an operating system and device drivers, each node of database system 10 stores and executes software modules used to implement the present invention. FIG. 2 is a schematic diagram depicting the software architecture of database system 10. Master node 11a includes stream management software 20, query cache software 21, Structured Query Language (SQL) parsing software 22, slave schema generation software 23, update/insert software 24, query parallelization/optimization software 25, multi-step query execution software 26, result set analysis software 28, date partition maintenance software 29, bulk loading software 30, Database Management System (DBMS) 31 and system management software 32. In embodiments using multiple master nodes, each master node is configured with the above-described software modules. Each slave node includes a DBMS (DBMS 33a to 33n) and slave management software 34a to 34n, respectively. Finally, management console software 35 is installed on one or more master nodes and is accessible via a terminal connected to the master node or via a client program running on a computer system separate from database system 10.

The foregoing software modules are stored on the respective disks of the database system nodes and are executed by the respective CPUs of those nodes. In a preferred embodiment, all of the nodes have an identical hardware configuration and can function as either a master node or a slave node by loading and executing appropriate software modules on the particular node. According to one embodiment of the invention, the software modules are implemented using the Java programming language. However, one skilled in the art will recognize that other programming languages can be used to implement one or more of the software modules. A detailed description of the operation of these software modules is provided below in the description of the operation of the invention.

One significant improvement of the invention over conventional shared-nothing parallel database designs is a significant reduction in the need to transfer data between nodes to run database queries such as joins. This improvement is achieved using a set of rules to automatically partition and distribute database tables across the slave nodes of database system 10. The partitioning and distribution of the database tables is performed in accordance with a generated slave schema.

Figure 3:
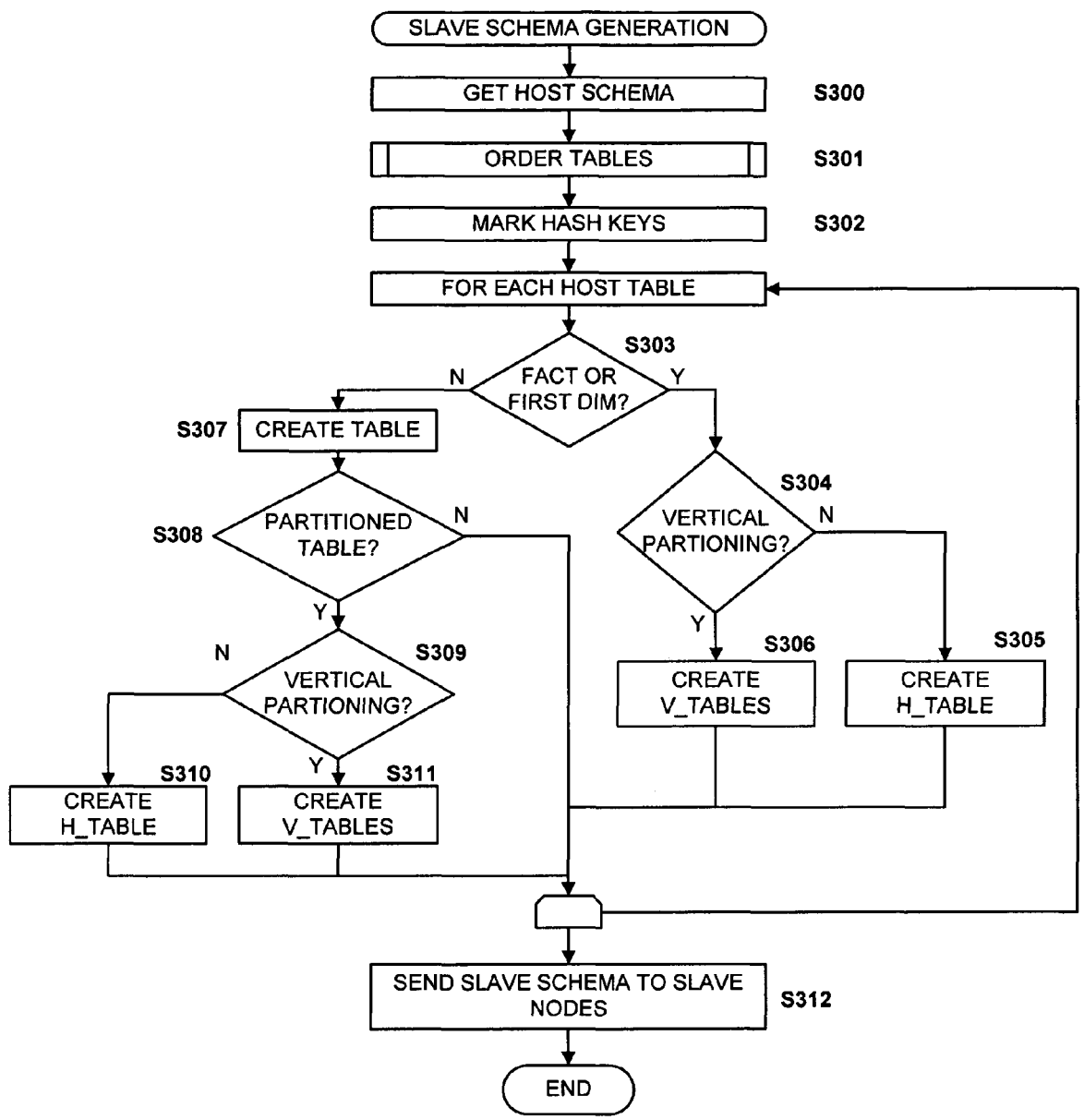
FIG. 3 is a flowchart depicting a process used to generate a slave schema.

An external host system forwards metadata defining a host schema to database system 10. Stream management software 20 receives the stream containing the metadata and forwards the metadata to DBMS 31. To generate a slave schema for the forwarded host schema, DBMS 31 forwards the metadata of the host schema to slave schema generation software 23. Upon receiving the host schema, slave schema generation software 23 applies the set of rules to generate a slave schema. The slave schema defines how the database tables are partitioned and distributed across slave nodes 12a to 12n. FIG. 3 is a flowchart depicting a process performed by slave schema generation software 23 to generate the slave schema according to one embodiment of the invention. The steps shown in FIG. 3 embody the set of rules used to generate the slave schema.

Figure 4:
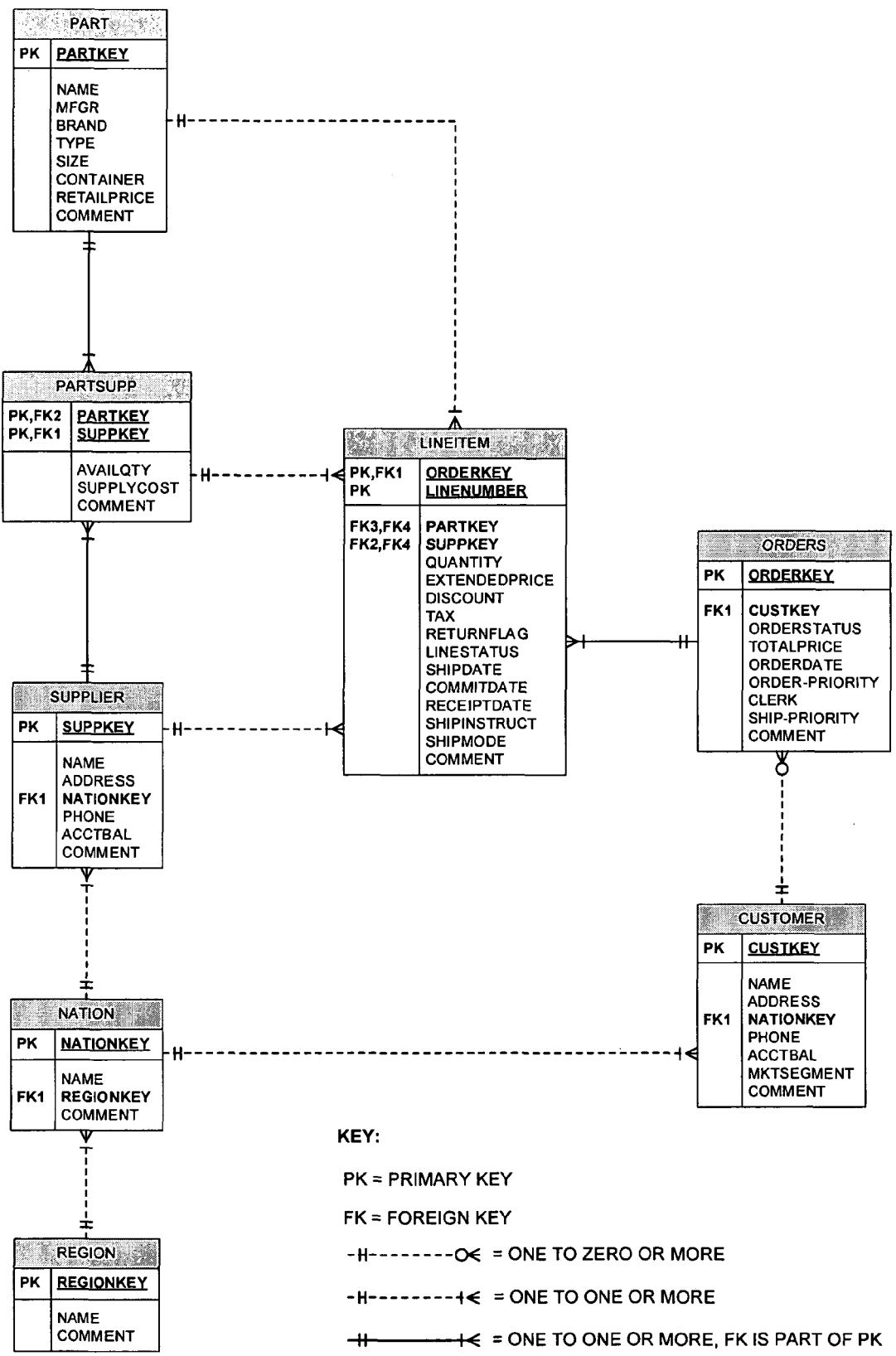
FIG. 4 is a diagram depicting an example of a host schema.

In step S300, slave schema generation software 23 receives a host schema provided by an external host system connected to database system 10. Possible host schemas include, but are not limited to, star schemas, snowflake schemas and normalized schemas. FIG. 4 is an example of a snowflake schema used as a standard benchmark for database systems created by the Transaction Processing Council. This schema includes one fact table (LINEITEM) and multiple dimension tables (ORDERS, CUSTOMER, PART, PARTSUPP, SUPPLIER, NATION and REGION). A fact table is defined as a table that has no parent-child relationships with other tables in which it is the parent. A dimension table is defined as a table that has a parent-child relationship with another table in which it is the parent. While the schema depicted in FIG. 4 includes only one fact table, it is to be understood that database schemas may include multiple fact tables.

Figure 5:
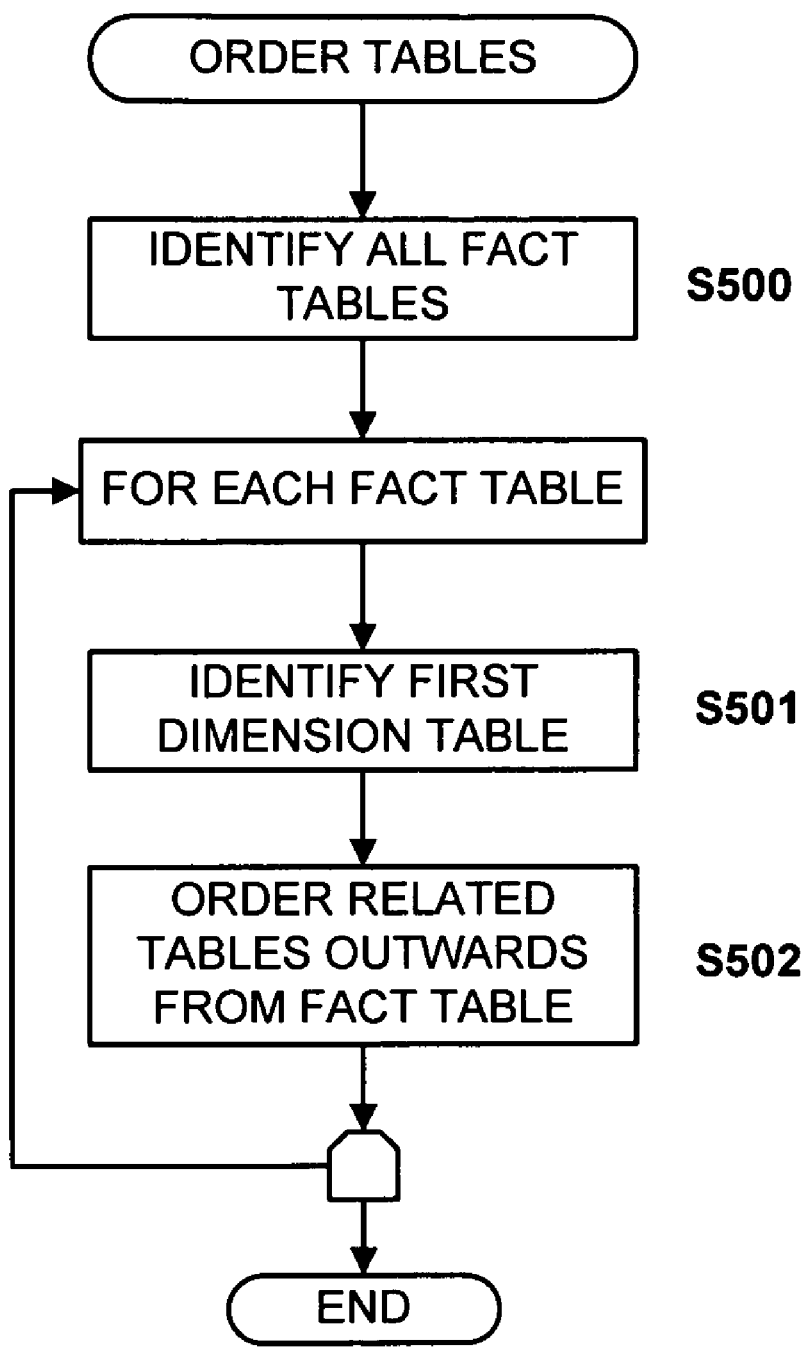
FIG. 5 is a flowchart depicting a process for ordering the tables of a host schema.

In step S301, the tables of the host schema are ordered in preparation for generating the slave schema. FIG. 5 is a flowchart depicting a process for ordering the host schema tables. In step S500, all fact tables within the host schema are identified. For each identified fact table, the table relationships defined in the host schema are followed outward from the fact table to identify a first dimension table in step S501 and order the other related dimension tables in step S502. The dimension tables are ordered based on their positions and relationships with respect to the fact table. Referring to the host schema depicted in FIG. 4, the LINEITEM table is identified as the sole fact table of the host schema. Working outward from the LINEITEM table, the ORDERS, PART, PARTSUPP and SUPPLIER tables are identified as tables having direct relationships with the LINEITEM table. This first tier of tables is ordered based on a specified criterion such as size. The first ordered table in this first tier, the ORDER table for example, is identified as a first dimension table. Using the table relationships and the specified ordering criteria, the remaining dimension tables are ordered.

To efficiently process queries using a parallel database system, the larger and more frequently accessed tables should be distributed as evenly and efficiently across the slave nodes as possible. In this regard, the present invention adopts a similar approach as that used in conventional shared-nothing database systems. Specifically, the present invention hash partitions the fact table and the first dimension table using a common key. By hash partitioning these tables using a common key, a given key value is mapped to a particular node and queries joining the two tables can be processed without transferring data between slave nodes. In step S302 of FIG. 3, a hash key for each paired fact table and first dimension table is marked. Referring again to the host schema depicted in FIG. 4, ORDERKEY is marked as the hash key since it is the primary key in the ORDERS table (first dimension table) and a foreign key in the LINEITEM table (fact table).

Once the database tables have been ordered and the hash keys marked, the slave schema generation process is ready to generate a slave schema. Each table of the host schema is examined and one or more corresponding tables are generated in the slave schema. First in step S303, it is determined if the current table is either a fact table or a first dimension table. Each fact table and first dimension table is horizontally partitioned and distributed across the slave nodes. In this manner, each slave node is responsible for a horizontally partitioned portion of each fact table and each first dimension table of the host schema.

In a typical database, tables often contain a significant amount of text. This text is usually found within a comment field of the table. An optional feature of the invention is to vertically partition the tables to remove these large comment fields and place them in a separate table within the slave schema. By ensuring that rows within the two tables are kept in exactly the same order, the comment field(s) for a particular row can be found by using the row identifier. The vertical-partition option is either set as a default rule or is set using input from a system administrator. In step S304, it is determined whether the tables are to be vertically partitioned. If vertical partitioning is not set, a horizontally partitioned table is generated in the slave schema in step S305. If vertical partitioning is set, a set of vertically partitioned tables is generated in the slave schema in step S306. These vertically partitioned tables are vertical partitions of a horizontally partitioned table, and as a set are equivalent to a horizontally partitioned table generated in step S305.

According to a preferred embodiment of the invention, a complete copy of each table besides the fact tables and the first dimension tables is stored on each slave node. In step S307, if the table being examined is not a fact table or a first dimension table, a full table is generated in the slave schema. By placing a complete copy of each of these outer dimension tables on each slave node, queries such as joins between the outer dimension tables and the fact table or the first dimension table are executed in parallel without requiring the transfer of table data between the slave nodes.

In addition to a complete copy of each of the outer dimension tables, a preferred embodiment of the invention optionally partitions and distributes the outer dimension tables across the slave nodes. By including a complete copy of the outer dimension tables and partitions of the outer dimension tables on the slave nodes, queries can be optimized to refer to the tables on the slave nodes that will yield the best system performance. However, certain database tables do not yield enough performance gain to justify the additional processing and storage space. For example, it might not provide significant performance benefits to partition and distribute relatively small database tables across the slave nodes. Accordingly, this aspect of the invention is an option that is set either as a default rule or by an input from a system administrator to not partition certain outer dimension tables, such as those below a specified size.

In step S308, it is determined whether the current table is to be partitioned or not. If the partitioning option is not set, or if the table meets the partitioning criteria, step S309 determines whether vertical partitioning of tables has been set. If vertical partitioning has not been set, a horizontally partitioned table is generated in the slave schema in step S310. If vertical partitioning has been set, a set of vertically partitioned tables is generated in the slave schema in step S311. These vertically partitioned tables are vertical partitions of a horizontally partitioned table, and as a set are equivalent to a horizontally partitioned table generated in step S310.

Once all of the tables of the host schema have been examined and the appropriate tables created in the slave schema, the generated slave schema is stored in DBMS 31 and is sent to each of the slave nodes in step S312. The slave schema is used by the master nodes and the slave nodes to load and partition the tables of a database into the database system.

Figure 6:
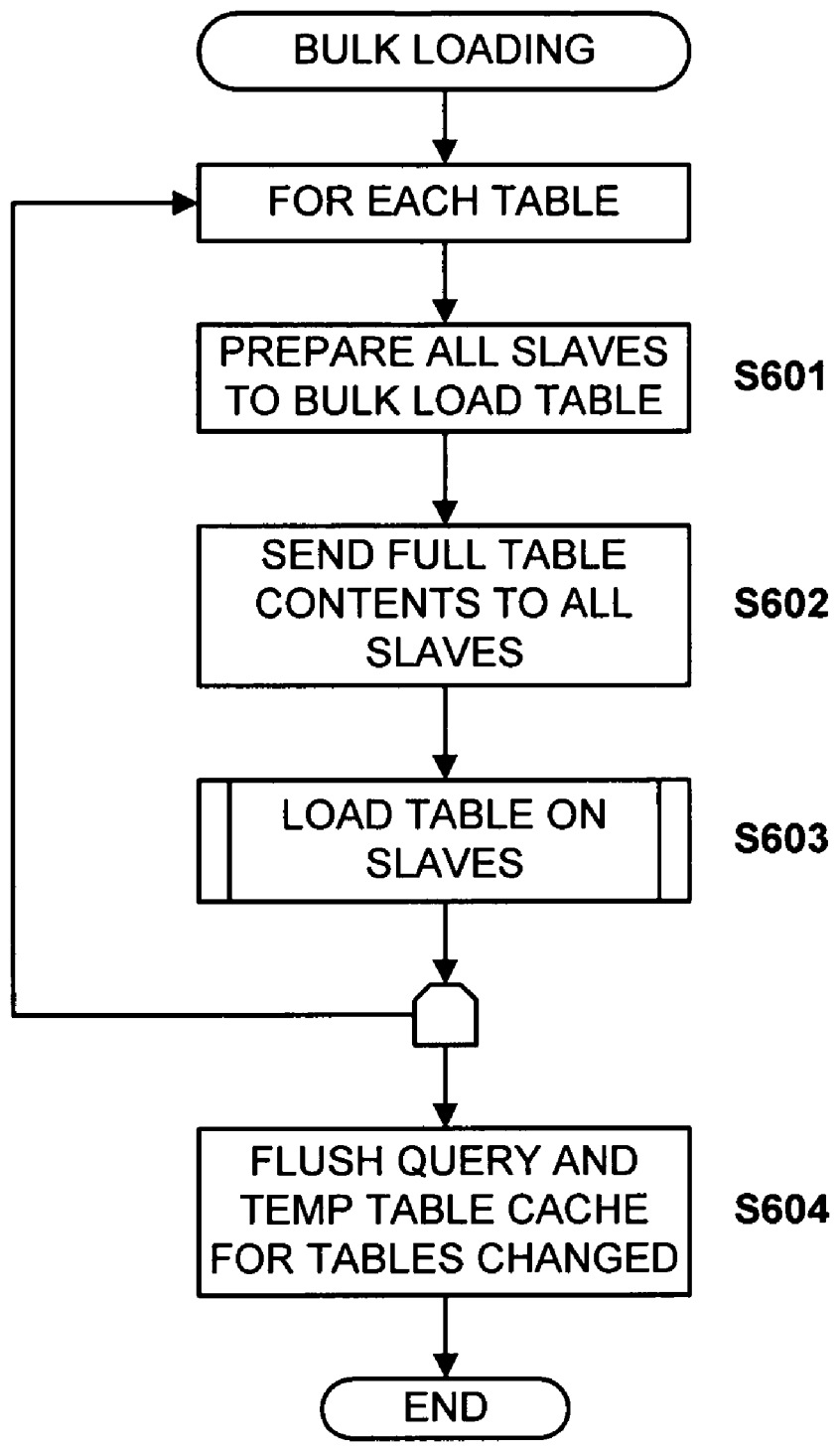
FIG. 6 is a flowchart depicting a process for bulk loading the tables of a database into the database system according to one embodiment of the invention.

Data for a particular database is bulk loaded into the database system of the invention via one of the master nodes or, alternatively, a dedicated bulk loading node. FIG. 6 is a flowchart depicting the process for bulk loading data into the database system. For each table to be loaded, the process involves preparing the slaves to receive data by setting appropriate locks on the relevant tables in step S601 and sending the data for each table to all of the slave nodes in step S602. Preferably, the data is sent to the slave nodes via a multicasting facility provided by the inter-node network.

Figure 7:
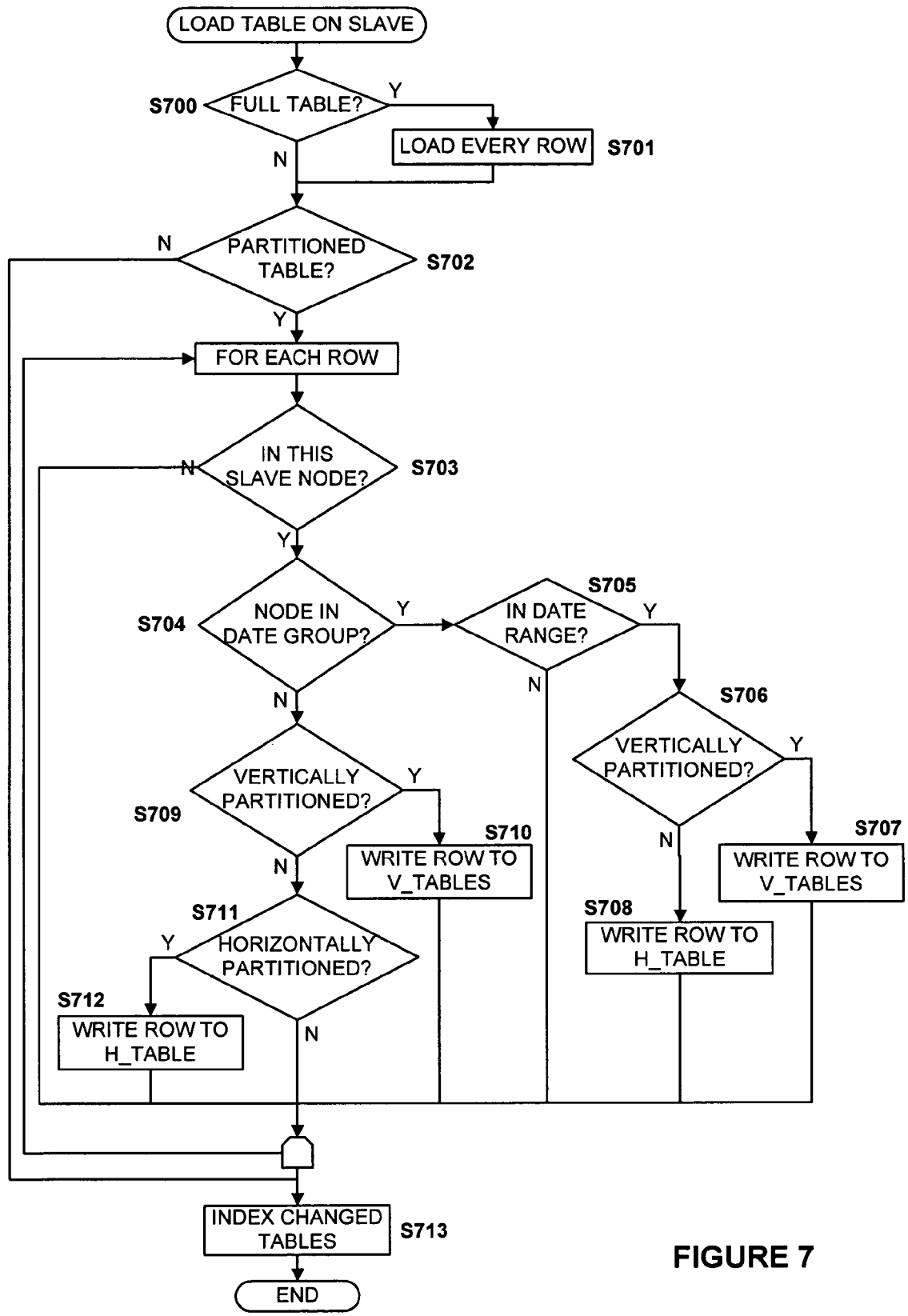
FIG. 7 is a flowchart depicting a process for loading database tables into slave nodes of a database system.

In step S603, the table received by the slave nodes is partitioned according to the slave schema. FIG. 7 is a flowchart depicting the process of loading and partitioning a table on a slave node. To load and partition the table on a particular slave node, slave management software 34 examines each row of the table. In step S700, it is determined whether the table is to be loaded in full, in which case every row is loaded into the appropriate table in step S701. In step S702, it is determined whether the table is held in partitioned form. If so, each row is examined in step S703 to determine whether the row is included in the partitioned tables of the particular slave node. Note that each slave node is responsible for a unique portion of rows of a partitioned table. Table partitioning is carried out using any of a number of known algorithms for dividing and distributing the rows of the table. Preferably, the tables are partitioned equally across the slave nodes. Based on the algorithm used to partition the rows of the table, it is determined whether the particular slave node is responsible for the row being examined.

An optional feature of the present invention is the use of date partitioning to partition and distribute the data. With date partitioning, the tables of a database are partitioned and distributed according to relevant dates within the data. The dates can be set using defined rules or controlled by system administrator input. For example, data for particular years, quarters or months can be stored on different slave nodes. These date partitioned tables are stored and used to process date-sensitive database queries. The date partitioned tables are regularly maintained to remove data that does not fall within the relevant date ranges. Preferably, the date partitioned tables are stored on slave nodes dedicated to date partitioning. However, the date partitioned tables can also be stored on the standard slave nodes along with the other partitioned and non-partitioned tables.

In step S704, it is determined if the particular slave node is a date-partitioned slave node and, if so, in step S705 whether the row being examined falls within the date range stored by the slave node. If the slave node is a date-partitioned slave node and the row falls within the relevant date range, it is determined in step S706 whether the row is vertically partitioned based on the slave schema. For vertically partitioned rows, the row is written into the appropriate set of vertically partitioned tables in step S707. If the row is not vertically partitioned, the row is written into the appropriate horizontally partitioned table in step S708.

An optional feature of the invention is the use of a further level of table partitioning within the slave nodes, using any of a number of known partitioning algorithms. For example, the tables can be partitioned by hash value or date range.

The database system of the invention is also designed to provide failover protection. To implement this protection, the slave nodes are assigned failover partners. In addition to its own partitioned tables, each slave node stores the partitioned tables of its failover partners and will use the same algorithm to update the relevant tables, as described herein. Using this failover system provides a high level of reliability without using mirrored or parity-based disk arrays at each node. This reduces implementation costs since RAID Level 0 disk systems can be used to provide higher performance without the greater costs associated with higher level RAID systems.

If the row being examined does not fall within the date range of date partitioned tables on the slave node, or if the slave node does not store date partitioned tables, it is determined in step S709 whether the row is vertically partitioned on the slave node. If the row is vertically partitioned, it is written to the appropriate set of vertically partitioned tables in step S710.

In step S711, it is determined whether the row is part of a horizontally partitioned table on the slave node. If the row is part of a horizontally partitioned table, the row is written to that table in step S712.

Once all of the rows for a particular table have been added to the database, the index for the various physical tables affected is updated in step S713.

Another performance enhancing feature of the present invention is the use of a query cache and a temporary table cache. A query cache is stored and maintained in DBMS 31 on each master node and in DBMS 33 on each slave node. The query cache stores query results for queries run on the particular node. A temporary table cache is stored and maintained in DBMS 31 on each master node to store temporary tables generated by the master node while executing multi-step queries. When tables are loaded into the database system, the query caches and temporary table caches that contain results generated based on prior versions of the tables must be cleared. Accordingly, in step S604 the relevant query caches and temporary table caches are flushed. A more detailed description of the operation of these caches is provided below.

Figure 8:
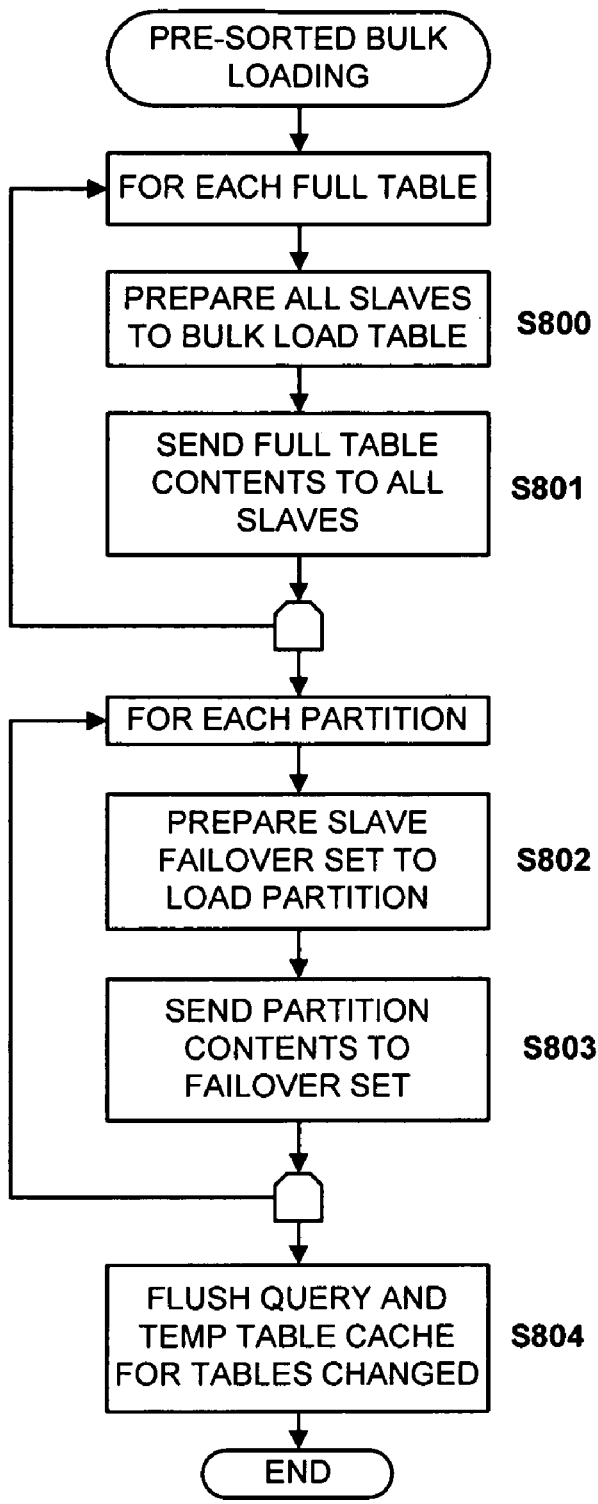
FIG. 8 is a flowchart depicting a process for bulk loading pre-sorted data directly into the slave nodes.

The foregoing described various processes used to bulk load tables into the database system by sorting and partitioning the tables. An optional process for loading data into the database system is to pre-sort the data using an external host system that has access to the generated slave schema and any system settings affecting data distribution. The pre-sorted data can bypass the master nodes and be loaded directly into the slave nodes. FIG. 8 is a flowchart depicting a process for bulk loading pre-sorted data.

As shown in FIG. 8, each table and each partition of the pre-sorted data is examined and loaded into the appropriate slave nodes. For each table that is stored in full on the slave nodes, all slave nodes are prepared to bulk load the table in step S800 and the full table contents are sent to all of the slave nodes in step S801. For each partition of the sorted data, the assigned failover set of slave nodes is prepared to load the partition in step S802 and the partition is sent to the failover set in step S803. Finally, in step S804 the appropriate query caches and temporary table caches are flushed.

Figure 9:
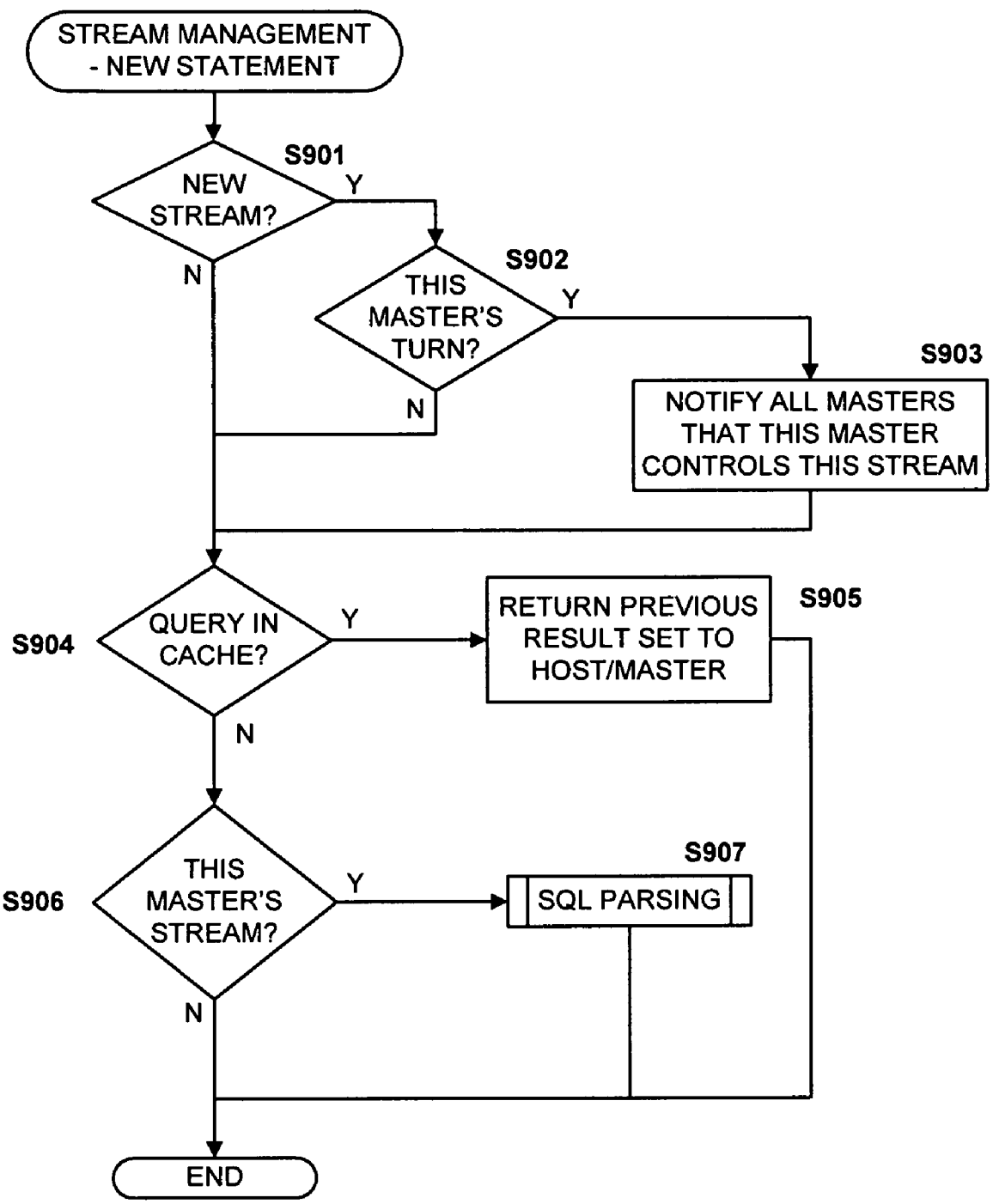
FIG. 9 is a flowchart depicting a process performed upon receiving a new statement from an external host system.

According to one embodiment of the invention, external host systems communicate with the database system using SQL statements. SQL statements are generally separated into streams by the host system, with each stream corresponding to a particular user or application. Using streams to organize SQL statements ensures that the statements are executed by the database system in the correct order. Streams of SQL statements received by the database system are managed by stream management software 20 on each master node. FIG. 9 is a flowchart depicting the processing performed by stream management software 20 upon receiving a new statement from an external host system.

As described above, the database system of the present invention includes one or more master nodes. SQL statements sent by an external host system are received by each of the master nodes and processed in the manner described in FIG. 9. Specifically, for each master node stream, management software 20 determines in step S901 if the received statement is the start of a new stream or part of an existing stream already being processed by the database system. If the statement is the beginning of a new stream, stream management software 20 determines in step S902 whether the stream should be controlled by that particular master node. Each stream is controlled by one master node in the database system. Stream management software 20 on each master node communicates with the other master nodes to determine which master node will control an incoming stream. Stream control is determined using any of a number of known load-balancing algorithms. If it is determined in step S902 that the corresponding master node is to control the stream, stream management software 20 notifies the other master nodes that it is controlling the stream in step S903.

As each statement is received by the master nodes, query cache software 21 in each master node compares the statement against the query cache of the master node in step S904. As mentioned above, each master node stores the results of previous queries in a query cache. In step S904, the statement is compared against the query cache to determine if an identical statement has been previously processed by the master node with on intervening changes to the underlying tables. If an identical statement has been previously processed, the corresponding result set for that statement is retrieved from the query cache and sent to either the external host system or the master node that controls the query stream in step S905 and processing of the statement by the master node terminates. If the statement is not found in the query cache, it is determined in step S906 if the received statement is part of a steam controlled by the associated master node. If the master node controls the particular stream, the statement processed by SQL parsing software 22 in step S907. If the statement is not part of a stream controlled by the associated master node, processing of the statement by the master node ends and stream management software 20 waits for the next statement to be received.

Figure 10:
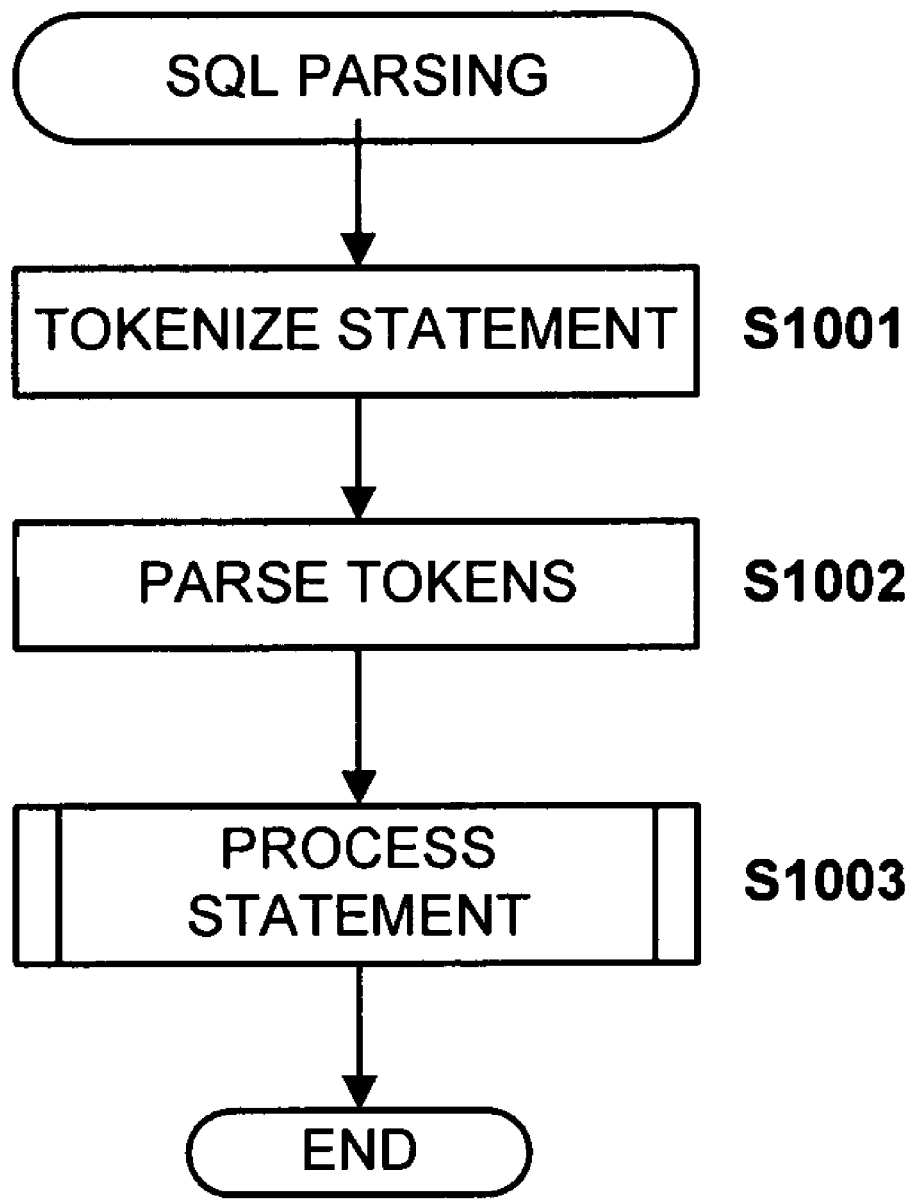
FIG. 10 is a flowchart depicting a process for parsing and processing a SQL statement.

FIG. 10 is a flowchart depicting a process performed by SQL parsing software 22 to prepare statements for further processing. To prepare each statement for further processing, the statement is tokenized in step S1001 and the tokens are parsed in step S1002. Finally, in step S1003 the relevant sub-routine to process the parsed statement is called. Possible sub-routines include, but are not limited to, alter table, update/insert data, and query parallelization.

Figure 11:
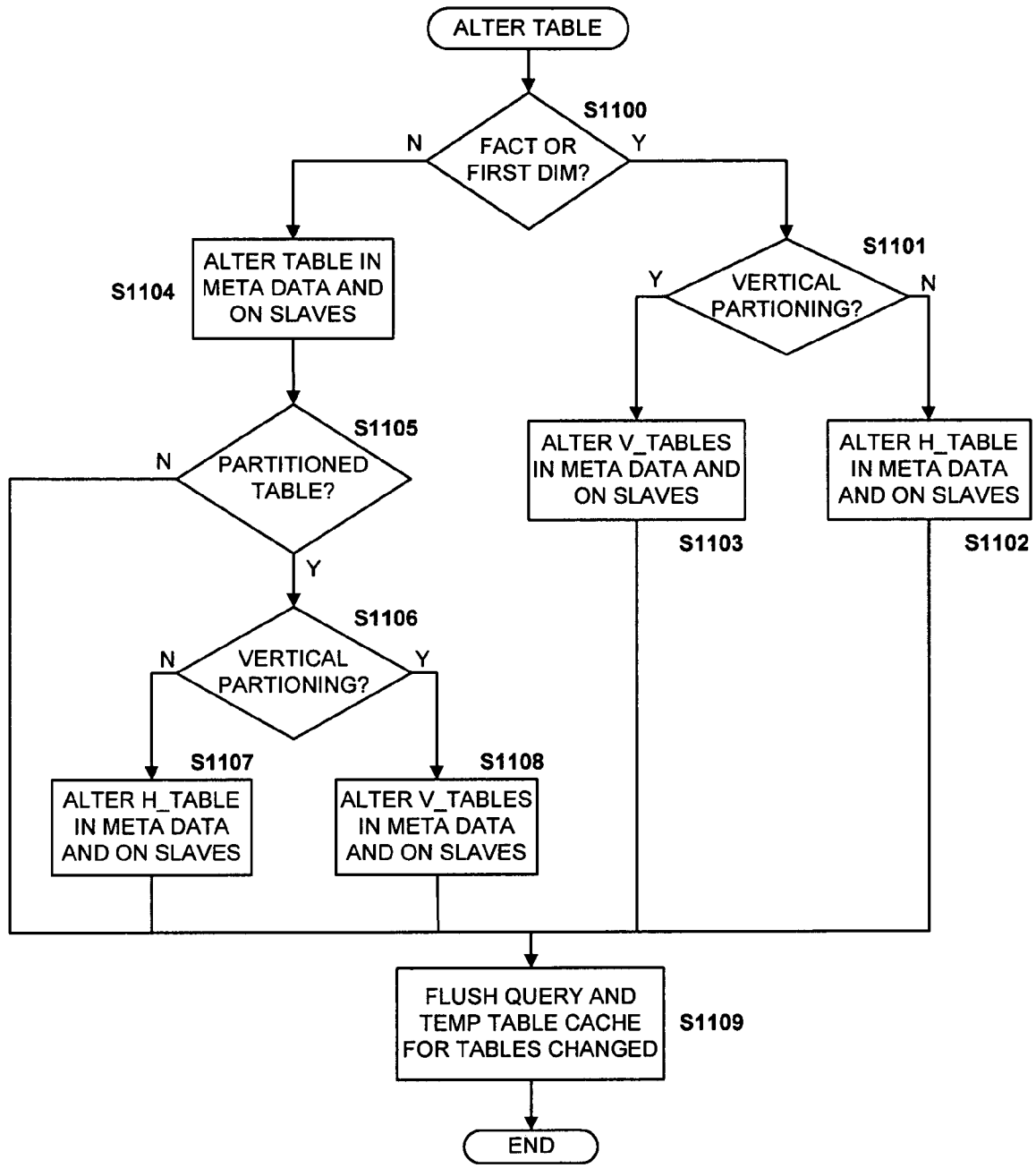
FIG. 11 is a flowchart depicting a process for altering a database table.

FIG. 11 is a flowchart depicting a process performed by an alter-table sub-routine called by SQL parsing software 22 to alter a database table. Alteration of database tables is primarily performed by slave schema generation software 23. The process begins by determining in step S1100 whether the table to be altered is a fact table or a first dimension table. If the table is a fact table or a first dimension table, it is determined in step S1101 whether the table being altered is vertically partitioned. If the table is not vertically partitioned, alterations to the table are made in the corresponding horizontally partitioned table in the metadata stored in DBMS 31 of the master node and on each of the slave nodes in step S1102. If the table being altered is vertically partitioned, the corresponding set of vertically partitioned tables is altered in the metadata stored in DBMS 31 of the master node and on each of the slave nodes in step S1103.

If the table to be altered is not a fact table or a first dimension table, the corresponding table is altered in the metadata stored in DBMS 31 of the master node and on each of the slave nodes in step S1104. In step S1105 it is determined whether the table to be altered is partitioned on the slave nodes. If the table is partitioned, it is determined in step S1106 whether the table is vertically partitioned. If the table is not vertically partitioned, the metadata and the actual table content for the corresponding horizontally partitioned table is altered in step S1107. If the table is vertically partitioned, the metadata and the actual table content for the corresponding set of vertically partitioned tables is altered in step S1108. Finally in step S1109, the query cache entries and temporary table cache entries that rely on the altered table are flushed.

Figure 12:
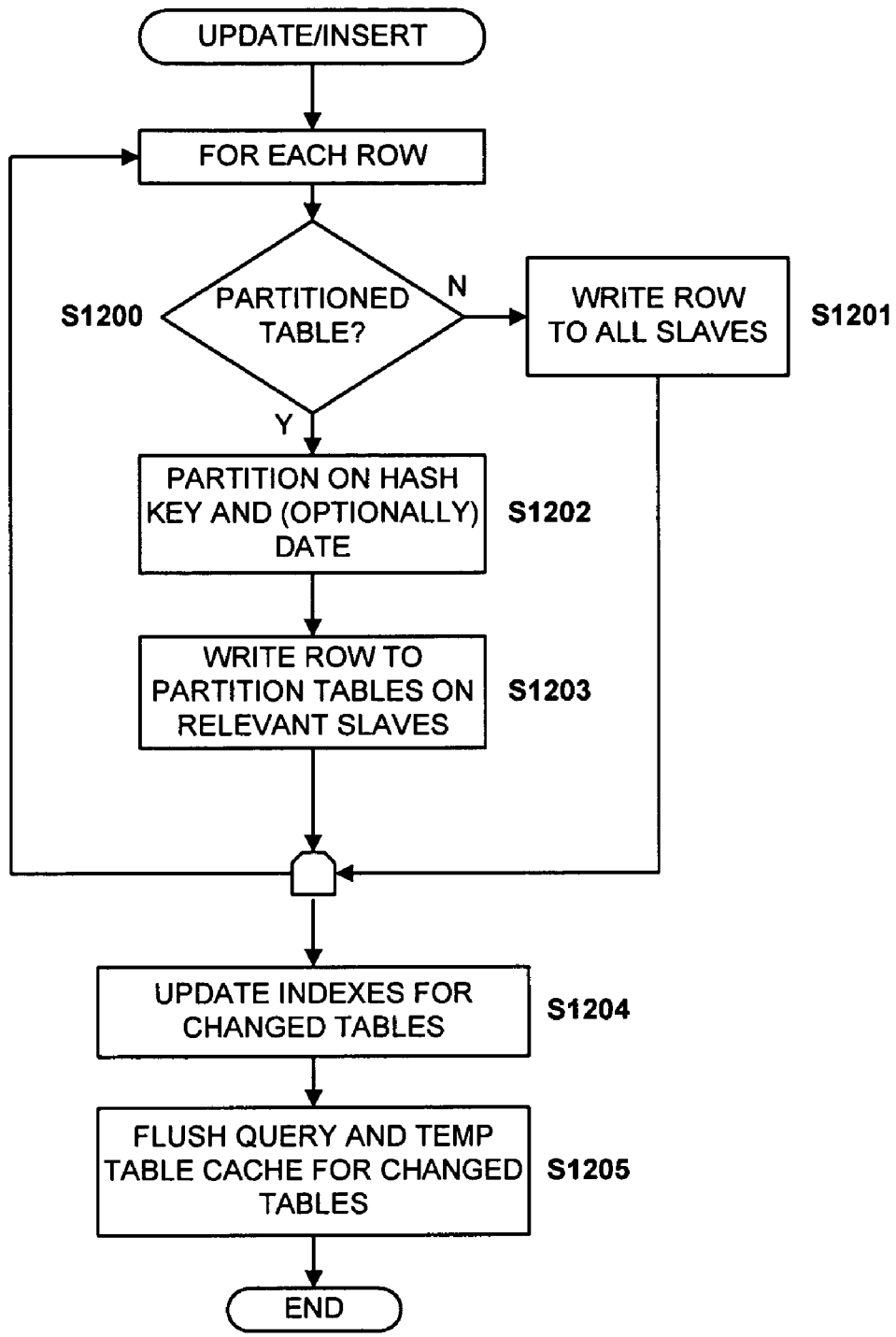
FIG. 12 is a flowchart depicting a process for updating/inserting data into database tables.

FIG. 12 is a flowchart depicting a process performed by an update/insert sub-routine called by SQL parsing software 22 to update or insert data into the database. For each row being updated or inserted, it is determined in step S1200 whether the row is part of a table held only in partitioned form on the slave nodes, such as a fact table or first dimension table. If the row is part of a table that is not held only in partitioned form, the row is written to each of the slave nodes in the system in step S1201. If the row is part of a table held only in partitioned form, the row is partitioned according to the appropriate hash key and optionally the relevant date in step S1202 and written to the partitioned tables on the relevant slave nodes in step S1203. In step S1204, the indexes for all changed tables in the database are updated. Finally, in step S1205, all query cache and temporary table cache entries that rely on a table in which data was updated/inserted are flushed.

Figure 13:
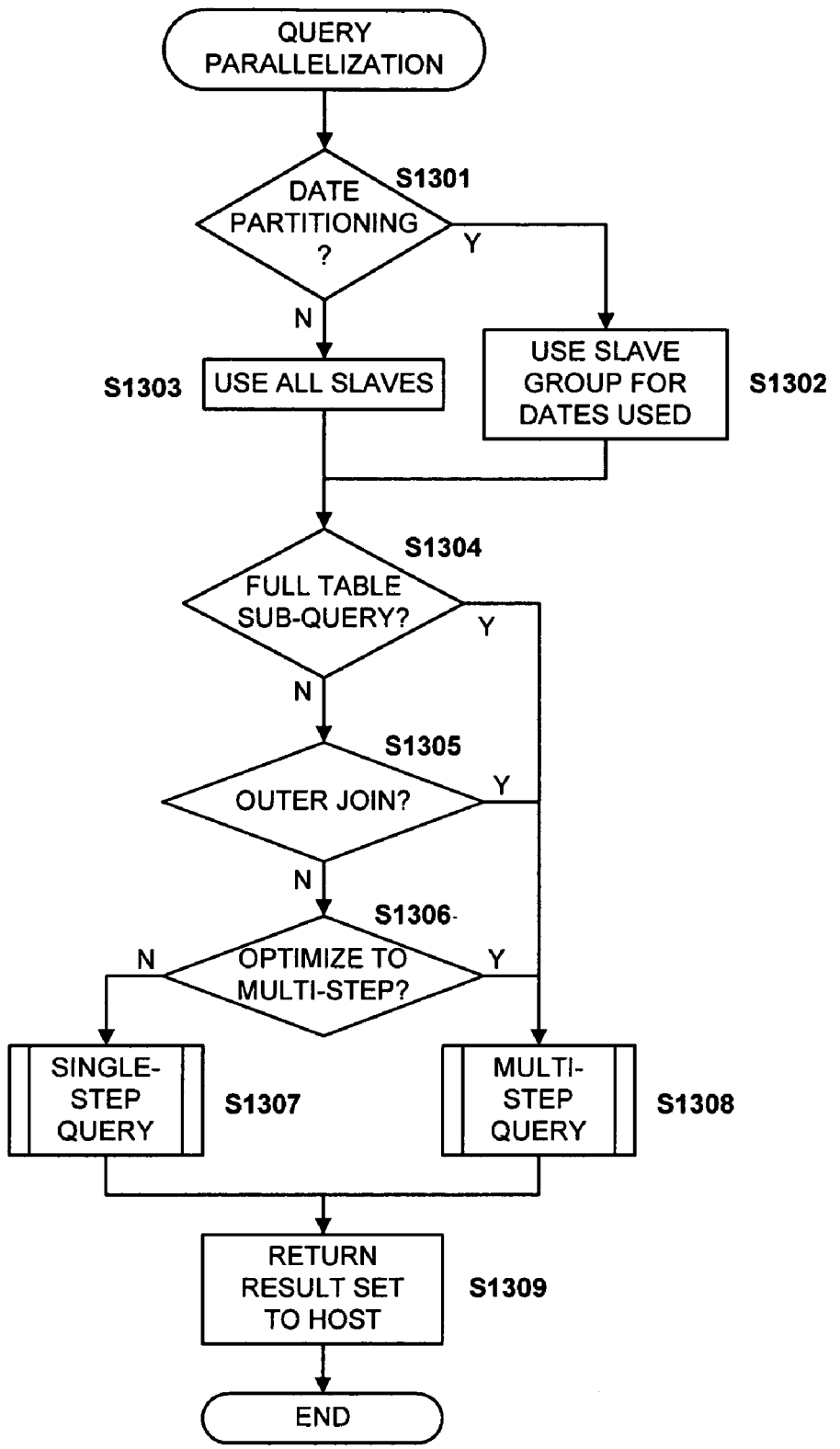
FIG. 13 is a flowchart depicting a query parallelization process.

Query statements are processed and optimized by query parallelization software 25. FIG. 13 is a flowchart depicting a query parallelization process. In step S1301, it is determined whether the query seeks a particular date range covered by any date partitions set in the database system. If the query seeks a date range covered by a date partition, the group of slave nodes used for that particular date range is designated in step S1302 to be used for processing the query. If the query does not seek a particular date range, or the date range does not correspond with any of the set date partitions, all slave nodes are designated in step S1303 to be used for processing the query. Steps S1304, S1305 and S1306 determine how to execute the query on the slave nodes based on the structure of the query and using techniques well know to those skilled in the art. In step S1304, sub-queries that must be run independently are split into two separate queries. The sub-query is executed first, with the intermediate results being gathered on the master node and then returned to the slave nodes for further processing alongside the rest of the query. In step S1305, outer joins are split into multiple queries that are executed in concert on the slave nodes and the master nodes to fulfill the query. Finally, in step S1306, the query optimizer assesses the cost of multi-step and single-step execution strategies and chooses the lowest cost option, again using techniques well known to those skilled in the art. The query is then passed to either step S1307 for single-step queries or step S1308 for multi-step queries, after which the result set is returned to the host in step S1309.

Figure 14:
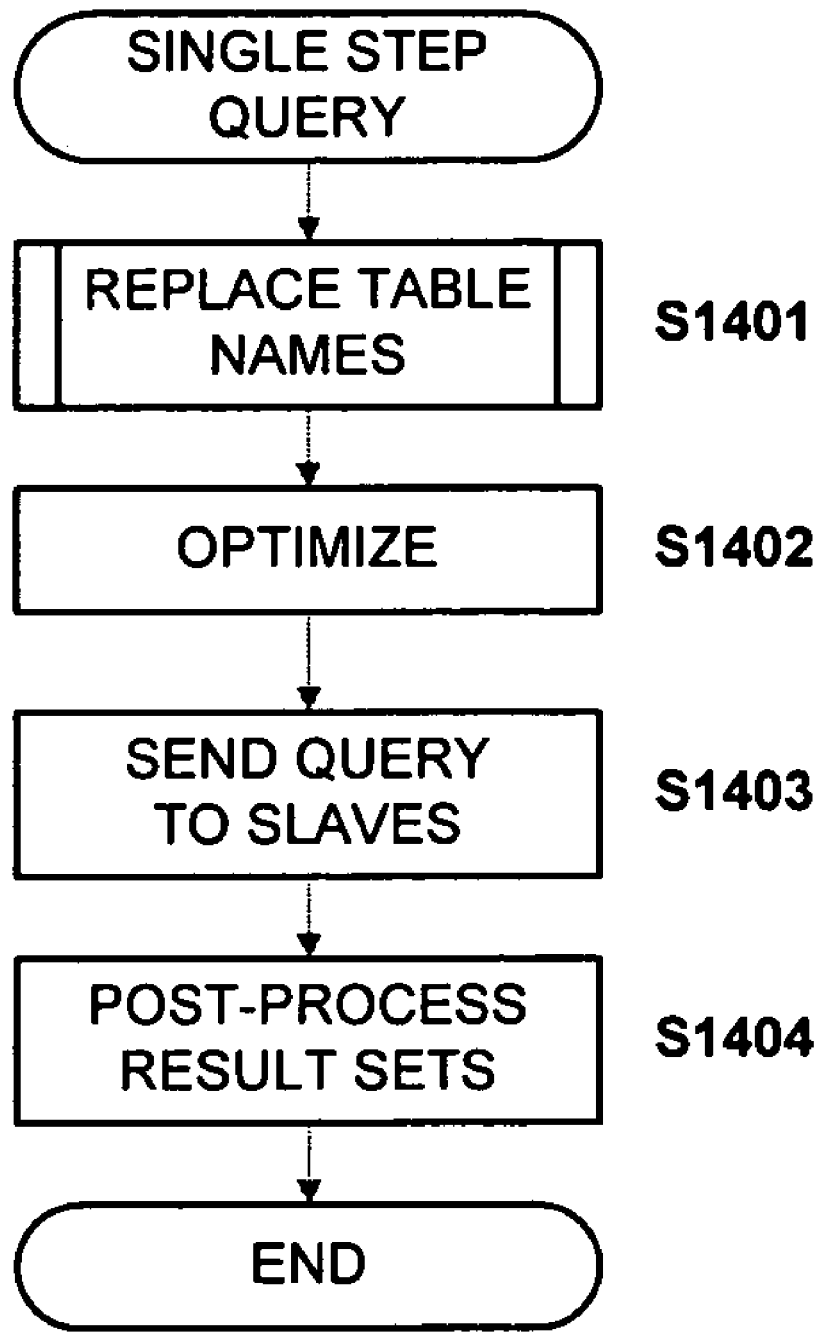
FIG. 14 is a flowchart depicting a process for running a single step query.
Figure 15:
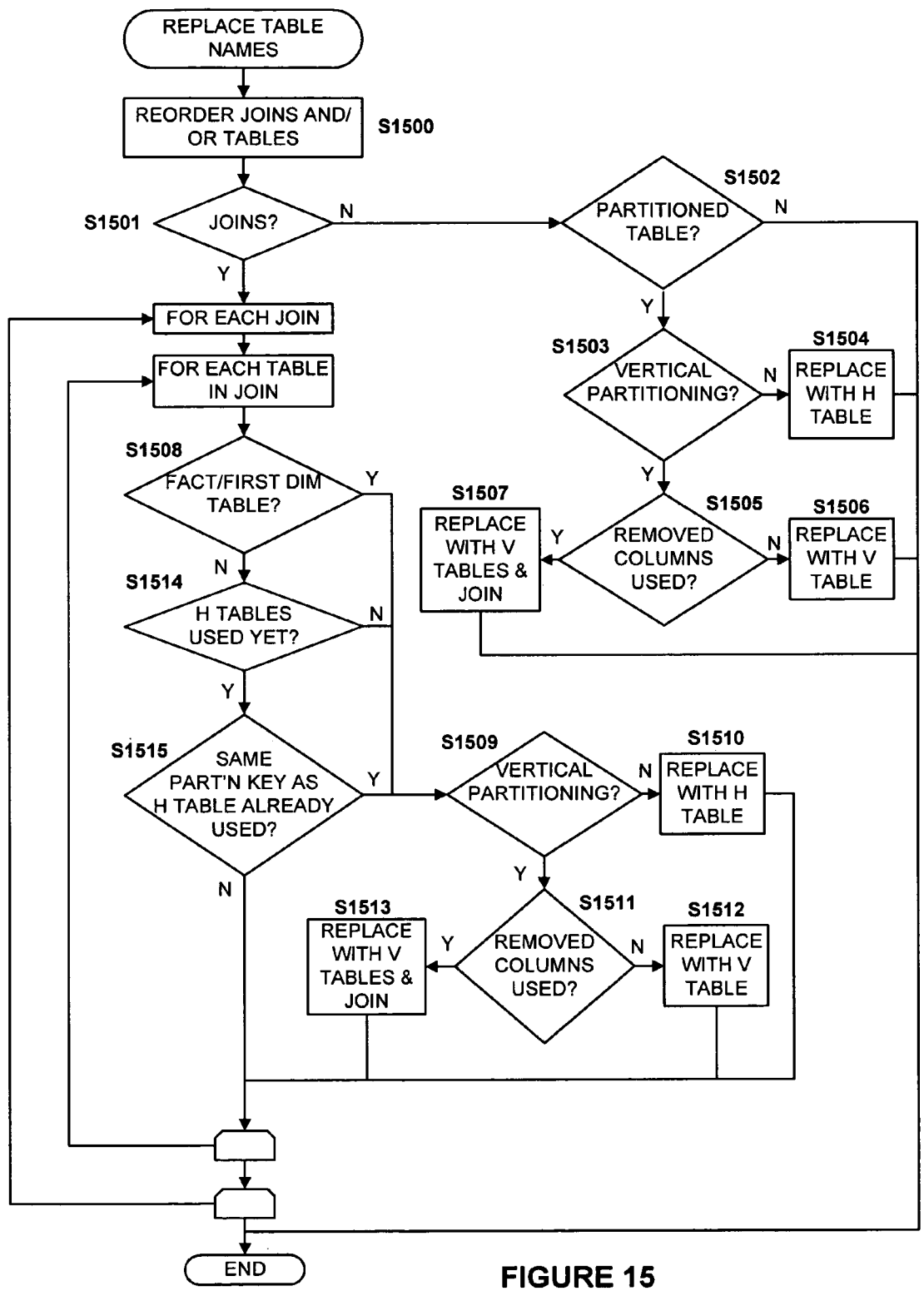
FIG. 15 is a flowchart depicting a process for replacing table names in a query with table names used in a slave schema.

FIG. 14 is a flowchart depicting a process for running a single step query. Queries are received from the external host system referring to tables using table names from the host schema. In order to process the queries in parallel using the slave nodes, the table names must be replaced with corresponding table names from the slave schema. In an alternative embodiment, the table names used in the host schema could be used in the generated slave schema so that single-step queries could be passed straight through to the slave nodes. In step S1401 the table names referred to in the query are replaced with the corresponding table names from the slave schema. FIG. 15 is a flowchart depicting a process used to replace the table names used in the query.

In step S1500, the joins and/or tables from the query are reordered working outwards from the fact table. The ordered query is examined in step S1501 to determine if there are any joins to be run in the query. If the query does not contain a join, it is determined in step S1502 whether the table used in the query is only held in partitioned form on the slave nodes. If the table is held complete on the slave nodes, the table name is not replaced and processing ends. If the table is only held in partitioned form, it is determined in step S1503 whether the table is vertically partitioned in the slave schema. If the table is not vertically partitioned, the table name is replaced with the name of the corresponding horizontally partitioned table in step S1504. Alternatively, if the table is vertically partitioned in the slave schema, it is determined in step S1505 whether the query uses any of the columns, such as large comment fields, that were removed by the vertical partitioning. If no removed columns are used in the query, the table name is replaced with the name of the corresponding vertically partitioned table in step S1506. If any removed columns are used in the query, the table name is replaced with the corresponding vertically partitioned table and the query is modified to get the corresponding row from the table containing the removed columns in step S1507. This is achieved via the row identifier using techniques known to those skilled in the art.

If it is determined in step S1501 that the query includes joins, each join is examined in turn. For each table in the current join, it is determined in step S1508 whether the table is a fact table or a first dimension table. If the table is a fact table or a first dimension table, it is determined in step S1509 if the table is vertically partitioned in the slave schema. If the table is not vertically partitioned, the name of the table is replaced with the name of the corresponding horizontally partitioned table in step S1510. If the table is vertically partitioned, it is determined if the query uses any of the columns removed in the vertical partition in step S1511. If no removed columns are used in the query, the name of the table is replaced with the name of the corresponding vertically partitioned table in step S1512. Alternatively, if any removed columns are used in the query, the name of the table is replaced with the corresponding vertically partitioned table and the query is modified to get the corresponding row from the table containing the removed columns in step S1513. This is achieved via the row identifier using techniques known to those skilled in the art.

If it is determined in step S1508 that the table is not a fact table or a first dimension table, it is determined in step S1514 whether any names of tables used in the query that have been examined have been replaced with the name of a corresponding horizontally partitioned table. If no horizontally partitioned table names have been included in the query, the process proceeds to step S1509. Steps S1509 to step S1513 are then repeated in the manner described above. If a table name has been replaced with that of a horizontally partitioned table, it is determined in step S1515 whether the table has the same partition key as the horizontally partitioned table already used. If the table has the same partition key, the join is carried out between the co-located partitions of the tables and the process proceeds to steps S1509 to S1513, which are performed in the manner described above. If the table does not have the same partition key, the table name is not replaced and processing ends.

Figure 16:
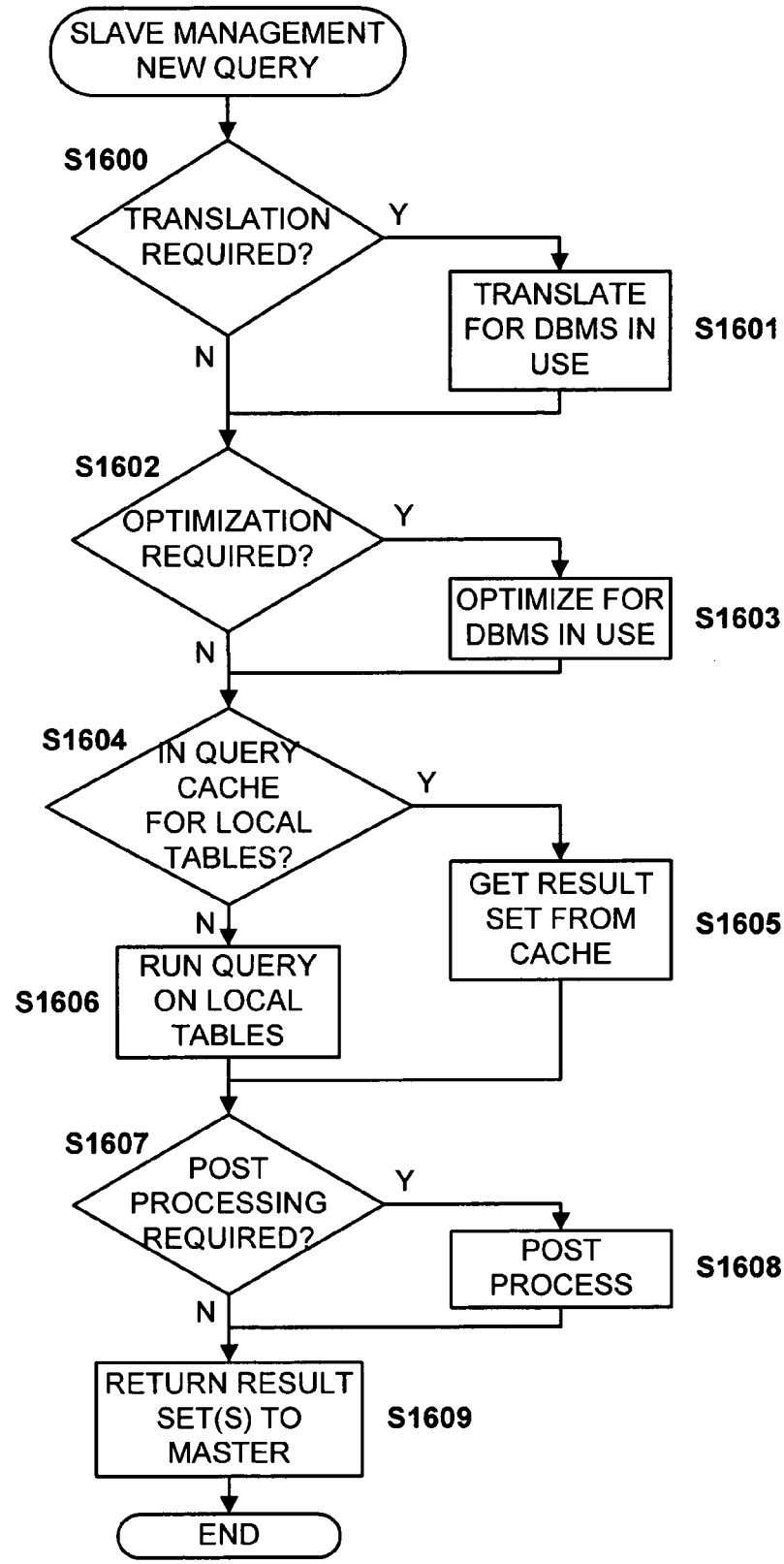
FIG. 16 is a flowchart depicting a process performed at a slave node to run a query.

Returning to FIG. 14, once the table names have been replaced in step S1401, the query is optimized in step S1402 for the particular database being used on the slave nodes using techniques well known to those skilled in the art. For example, settings for the cost of CPU cycles relative to I/O cycles can be changed so that the query is executed more efficiently. The optimized query is then sent to the slave nodes in step S1403. In the event of a slave node failure, the query is sent to the appropriate failover partners of the failed slave node, in addition to the other slave nodes in the system, as described in more detail below. Slave management software 34 on each slave node receives and processes the query from the responsible master node. FIG. 16 is a flowchart depicting the process steps performed by slave management software when a new query is received. Note that in some cases, the query can be executed directly by the DBMS on the slave nodes without intervention by the slave management software.

Upon receiving a new query from a master node, slave management software 34 determines in step S1600 whether the query must be translated for the DBMS being used on the slave node. The system design of the invention does not require a proprietary DBMS to be used at the slave level of the system. This feature reduces system costs and implementation time since an off-the-shelf DBMS can be used on the slave nodes. If translation is required, the query is translated for the particular DBMS in step S1601. In step S1602, it is determined whether any optimization needs to be performed to run the query in the particular DBMS. If optimization is required, the query is optimized in step S1603.

Similar to the process performed at the master level, new queries are checked against a query cache to see if the query has been previously run against the database with no intervening changes to the tables referred to in the query. Slave management software 34 maintains a query cache for both the failover tables and the local tables assigned to that particular slave node. Certain DBMS products include a query cache of their own. If the DBMS running on the slave node maintains a query cache, slave management software 34 does not need to check or maintain its own query cache. Together with the query cache maintained at the master level, the invention provides a bi-level query cache that improves system performance by preventing unnecessary repetition of query processing.

In step S1604, the received query is compared against the query cache. If the query is found in the query cache, the result set is retrieved from the query cache in step S1605. If the query is not found in the query cache, the query is sent to the DBMS in step S1606 to be run.

Once the result set has been obtained, slave management software 34 determines in step S1607 if the result set(s) requires post processing prior to returning the result set(s) to the master node. If post processing is required, it is performed in step S1608. Finally, the result set(s) is returned to the master node originating the query in step S1609.

Returning again to FIG. 14, result set analysis software 28 on the master node receives the result sets from each of the slave nodes used to process the query. In step S1404, result set analysis software 28 performs post processing on the received result sets. Post processing includes, but is not limited to, combining the result sets into a single result set, organizing the results within the result set, and formatting the result set into a format compatible with the external host system that submitting the query.

Figure 17:
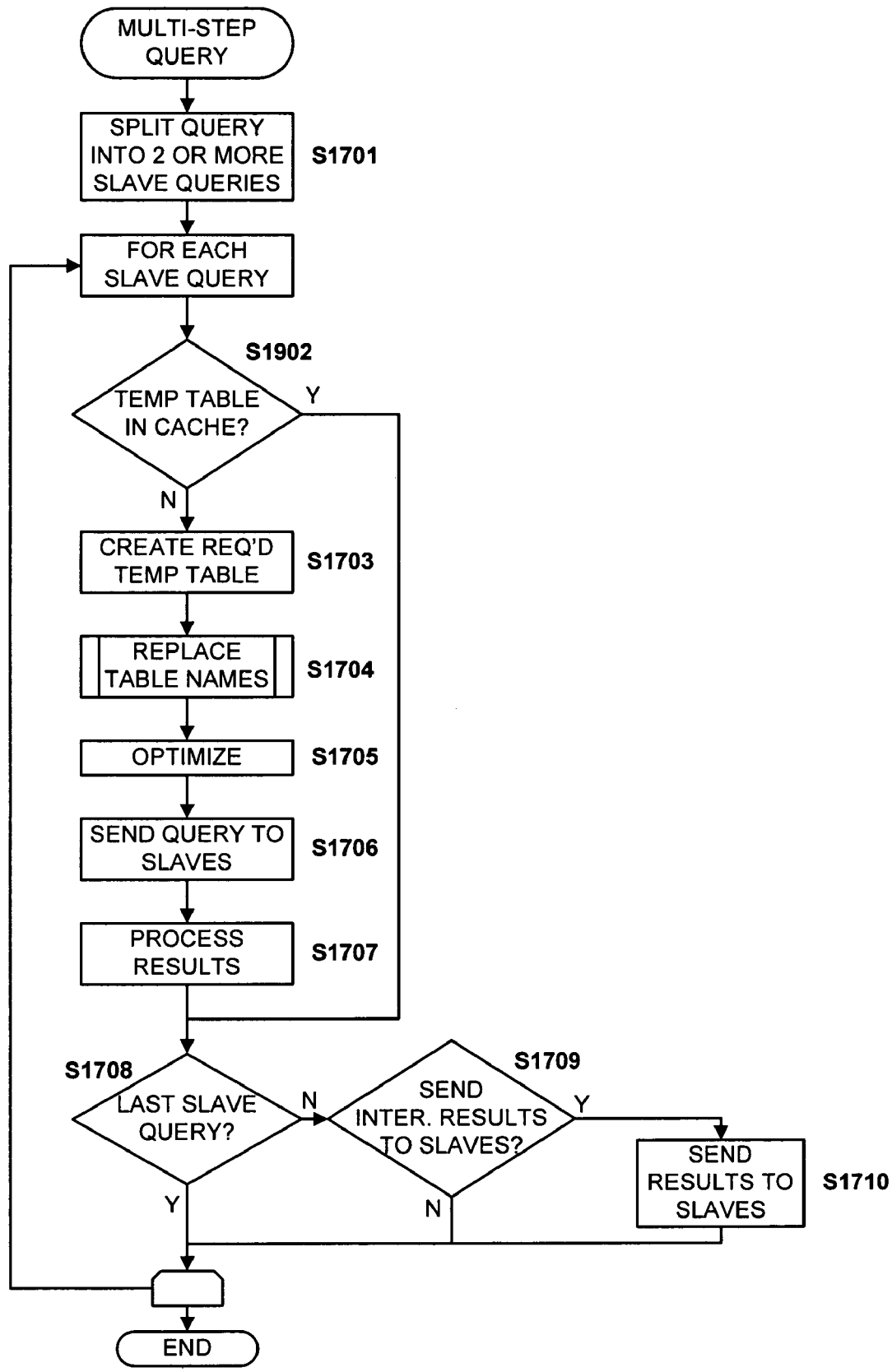
FIG. 17 is a flowchart depicting a multi-step query process.

FIG. 17 is a flowchart depicting a multi-step query process according to one embodiment of the invention. In step S1701, the query is split into two or more slave queries. Splitting these queries into multiple slave queries to be run in series on the slave nodes removes the need to transfer data between slave nodes to process the original query and improves the efficiency of the system running these queries.

Multi-step queries rely on the use of temporary tables on the master node running the query. These temporary tables store intermediate result sets generated by running the individual slave queries. The temporary tables are used to accumulate the result sets from each slave query. Alternatively, temporary tables may be sent to the slave nodes to run subsequent slave queries which join a temporary table with a local table on the slave nodes.

Similar to the query caches used on the master and slave nodes of the database system, each master node maintains a temporary table cache storing copies of temporary tables created for slave queries run by that master node in DBMS 31 of that master node. When running a slave query, the slave query is checked against the temporary table cache in step S1702 to determine if the particular slave query has been run with no intervening changes to the underlying tables the temporary table is dependent upon. If there is not a match in the temporary table cache, a temporary table for the slave query is created in step S1703. The slave query is then run and results processed in steps S1704 to S1707. The actions performed in these steps correspond with those performed in steps S1401 to S1404 from FIG. 14 and therefore will not be described again.

Once the slave query has been processed, or if a match for the slave query was found in the temporary table cache, the master node determines in step S1708 if any slave queries remain. If there are additional slave queries to be run, it is determined in step S1709 whether the subsequent slave query requires the temporary table for processing. If the temporary table is required on the slaves, the temporary table is sent to the slave nodes in step S1710 and processing returns to step S1702. If the temporary table is not required, processing simply returns to step S1702 for the next slave query.

As shown in FIG. 13, once the query received from the external host system has been run and processed, either as a single step query or a multi-step query, the final result set is returned to the external host system in step S1309.

Each master node in the database system of the present invention interfaces to system management software 32 to monitor the status of the other nodes in the database system. Examples of suitable system management software include IPMI (Intelligent Platform Management Interface) and Intel's System Manager.

Upon receiving notification of the failure of a master node, stream management software 20 sends a system status message to management console 35 indicating the failure of a master node. Management console 35 is used by the system administrator to track the status of the database system and to identify failed nodes that must be repaired or replaced to maintain system performance. Once management console 35 is notified of the master node failure, stream management software 20 executes a master node failover process.

Figure 18:
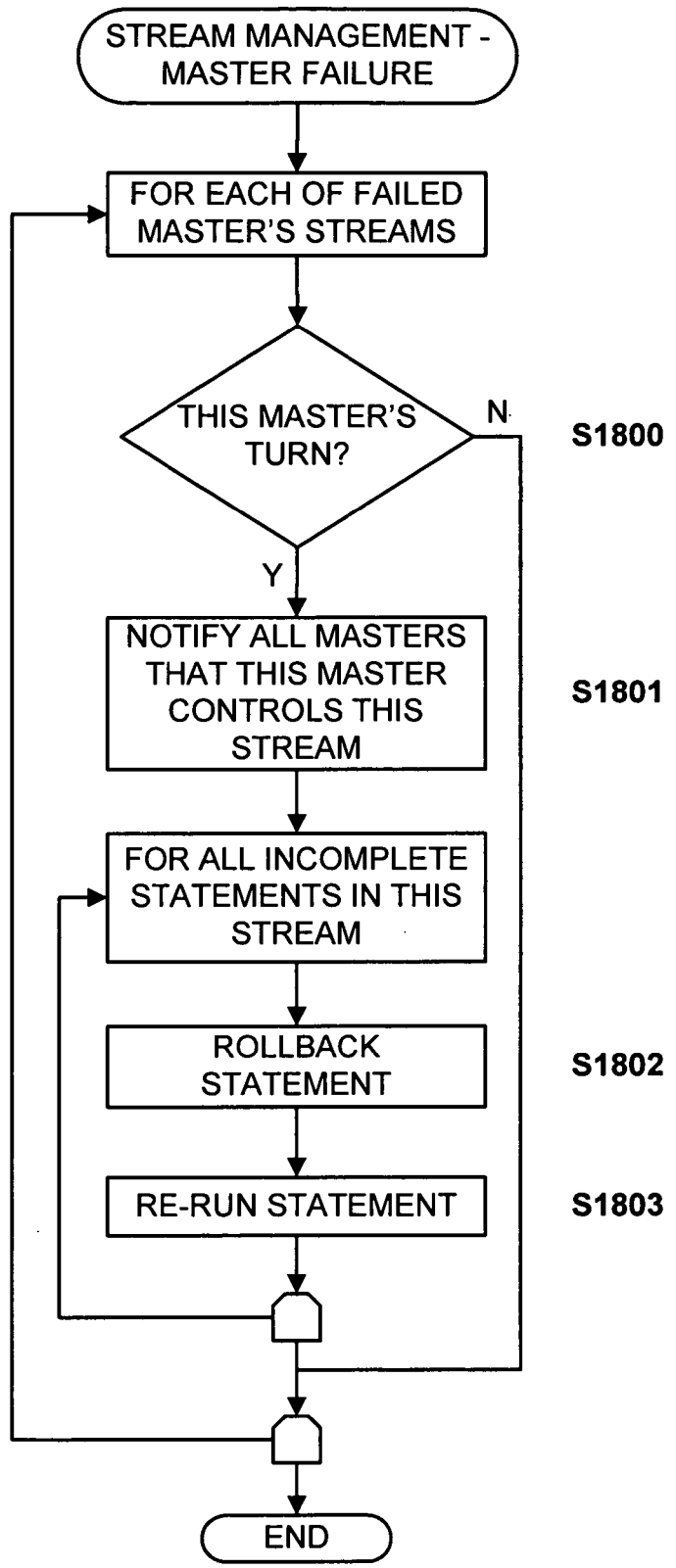
FIG. 18 is a flowchart depicting a failover process performed in the event of a master node failure.

FIG. 18 is a flowchart depicting the failover process performed by stream management software 20 in the event of the failure of a master node in the database system. The process depicting the FIG. 18 is performed for each of the streams being managed by the failed master node. In step S1800, the master node determines if it is responsible for the particular stream of the failed master node. According to one embodiment of the invention, this determination is made between the operational master nodes of the database system using the same load balancing method used to handle new streams received by the database system. However, other methods known to those skilled in the art can be used to make this determination. If the master node determines that it is responsible for the particular stream, the master node notifies the other master nodes in step S1801 that it is controlling the stream.

Once a master node has assumed control over a stream, each of the incomplete statements from that stream are taken over by the master node. In step S1802, the incomplete statement is rolled back using well known transaction management techniques. The statement is then re-run in step S1803. In this manner, each stream controlled by the failed master node is taken over by an operational master node to maintain operation of the database system. Once the failed master node has been restored or replaced, it is available for new streams received by the database system.

Figure 19:
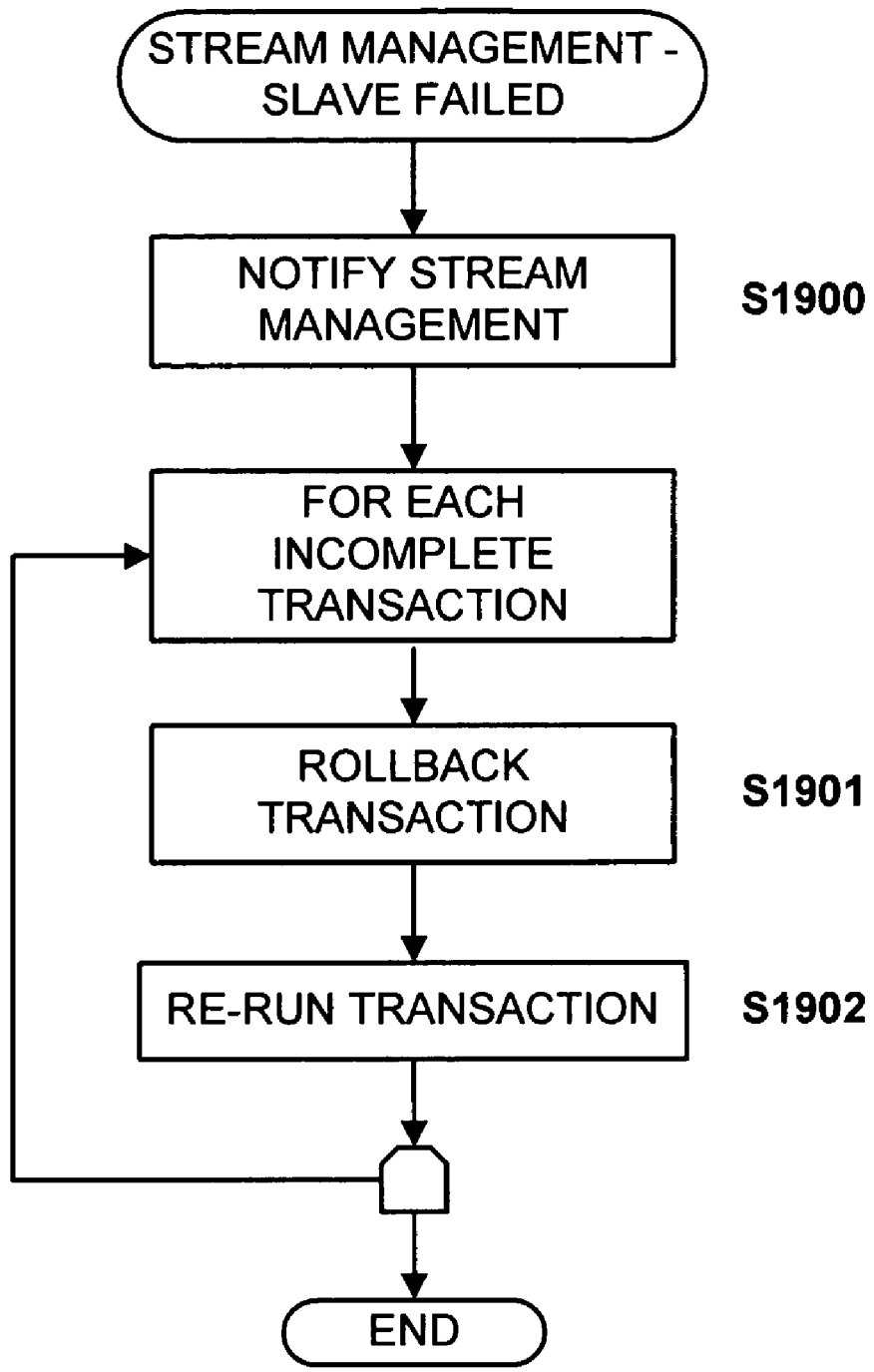
FIG. 19 is a flowchart depicting a failover process performed in the event of a slave node failure.

In addition to monitoring the other master nodes in the database system, system management software 32 also monitors each of the slave nodes in the system. FIG. 19 is a flowchart depicting a process executed upon failure of a slave node in the database system. In the event of a slave node failure, stream management software 20 is notified of the failure in step S1900. Stream management software 20 then notifies the system administrator of the node failure via management console 35. For each incomplete transaction involving the failed slave node, stream management software 20 rolls back the incomplete transaction in step S1901 and re-runs the transaction in step S1902 using the corresponding failover partner(s) in place of the failed slave node.

During the period while the failed slave node is being restored or replaced, the master nodes execute queries on both the regular operational slave nodes and the relevant failover partner slave nodes. Accordingly, operation of the database system is maintained despite the failure of a slave node. Once the slave node has been restored or replaced, the master nodes return to normal query execution.

Alternative embodiments of the invention include using a hierarchical master node configuration to manage a large number of slave nodes. In this configuration, processing performed by the master nodes is broken down into multiple layers to improve performance. In addition, some of the processing performed at the slave node level could be moved to a master node level. Other embodiments include using a shared storage system for the slave nodes of the database system in place of the direct attached storage described above. Failover data could be stored in shared storage and thereby allow any available slave node to perform failover duties for a failed node.

The ultra-shared-nothing parallel database system described above provides significant advantages over convention shared-nothing parallel database system. First and foremost, the database system of the present invention avoids query skew and the detrimental effects this has on database performance. Second, the partitioning and distribution of a database across the slave nodes of the database system is performed automatically. This increases system performance without adding complexity to system administration. Third, the bi-level cache used to cache query results prevent unnecessary repetition of processing the same query multiple times. Finally, the failover process of the database system maintains system operation in the event of node failure.

The foregoing description is intended to illustrate preferred embodiments of the present invention. However, the examples set forth above are not intended to limit the scope of the invention, which should be interpreted from the claims set forth below. It is to be understood that various modifications can be made to the illustrated examples without departing from the spirit and scope of the invention.

What is claimed is:

1. A parallel database system comprising:
   a master node;
   a plurality of slave nodes; and
   means for distributing a database across said plurality of slave nodes, the database comprising a fact table and a plurality of dimension tables,
   wherein the fact table and a first dimension table of the plurality of dimension tables are partitioned and stored across said plurality of slave nodes,
   wherein all dimension tables of the plurality of dimension tables other than the first dimension table are duplicated and stored on each of said plurality of slave nodes, and
   wherein up to a plurality of the dimension tables other than the first dimension table which have a minimum size are partitioned and stored across said plurality of slave nodes in addition to being duplicated and stored on each of said plurality of slave nodes.

2. The parallel database system according to claim 1, wherein the up to a plurality of the dimension tables are partitioned by row.

3. The parallel database system according to claim 1, wherein the up to a plurality of the dimension tables are partitioned by column.

4. The parallel database system according to claim 1, wherein the master node and each of the plurality of slave nodes include substantially identical hardware and are each configurable to operate either as a master node or a slave node.

5. The parallel database system according to claim 1, wherein the fact table and the first dimension table are partitioned by row.

6. The parallel database system according to claim 5, wherein the fact table and the first dimension table are hash partitioned on a common key.

7. The parallel database system according to claim 5, wherein the fact table and the first dimension table are partitioned by column.

8. The parallel database system according to claim 1, wherein the fact table and plurality of dimension tables are partitioned by date across a plurality of said plurality of slave nodes.

9. The parallel database system according to claim 1, wherein said partitioning means automatically partitions and distributes database tables across said plurality of slave nodes.

10. The parallel database system according to claim 1, further comprising means for translating a query against the database into at least one sub-query that is executable by said parallel database system without transferring data between said slave nodes.

11. The parallel database system according to claim 10, further comprising means for caching query results produced by said parallel database system.

12. The parallel database system according to claim 11, wherein said master node includes means for caching query results produced by said master node.

13. The parallel database system according to claim 12, wherein each of said plurality of slave nodes includes means for caching sub-query results produced by the respective slave node.

14. The parallel database system according to claim 1, wherein for each of said plurality of slave nodes, a copy of the dataset stored on the respective slave node is stored on another of said plurality of slave nodes assigned as a failover partner to the respective slave node.

15. The parallel database system according to claim 14, wherein the failover partner is configured to execute sub-queries to be executed by the respective slave node in the event of failure of the respective slave node.

16. A method for managing a database within a parallel database system, the database comprising a fact table and a plurality of dimension tables, said method comprising the steps of:
identifying the fact table and a first dimension table of the plurality of dimension tables within the database;
partitioning and storing the fact table and the first dimension table of the plurality of dimension tables across a plurality of slave nodes of the parallel database system;
duplicating and storing each of the dimension tables of the plurality of dimension tables other than the first dimension table on each of the plurality of slave nodes; and
partitioning and storing up to a plurality of the dimension tables other than the first dimension table having a minimum size across the plurality of slave nodes in addition to duplicating and storing those tables on each of the plurality of slave nodes.

17. The method according to claim 16, wherein the up to a plurality of the dimension tables are partitioned by row.

18. The method according to claim 16, wherein the up to a plurality of the dimension tables are partitioned by column.

19. The method according to claim 16, wherein the up to a plurality of the dimension tables are partitioned both by row and by column.

20. The method according to claim 16, wherein the fact table and the first dimension table are partitioned by row.

21. The method according to claim 20, wherein the fact table and the first dimension table are hash partitioned on a common key.

22. The method according to claim 20, wherein the fact table and the first dimension table are also partitioned by column.

23. The method according to claim 16, further comprising partitioning the fact table and the first dimension table by date across a plurality of slave nodes.

24. The method according to claim 16, further comprising translating a query against the database into at least one sub-query that is executable by the parallel database system without transferring data between the slave nodes.

25. The method according to claim 24, further comprising caching the results of the query on a master node.

26. The method according to claim 25, further comprising caching the results of the at least one sub-query on the respective slave nodes.

27. The method according to claim 16, further comprising storing a copy of the dataset from a slave node on a failover partner assigned to the slave node.

28. The method according to claim 27, further comprising executing sub-queries to be executed by a failed slave node on the slave node's failover partner.

29. Computer executable process steps stored on a computer readable memory medium, said process steps for performing the method described in any one of claims 16 to 28.

* * * * *